(12) United States Patent
Hosoe

(10) Patent No.: US 10,841,468 B2
(45) Date of Patent: Nov. 17, 2020

(54) DISPLAY APPARATUS FOR DISPLAYING OPERATING SECTION FOR RECEIVING OPERATION, IMAGE PICKUP APPARATUS, IMAGE PICKUP SYSTEM, CONTROL METHOD OF DISPLAY APPARATUS, AND STORAGE MEDIUM

(71) Applicant: CANON KABUSHIKI KAISHA, Tokyo (JP)

(72) Inventor: Hiroshi Hosoe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 16/133,866

(22) Filed: Sep. 18, 2018

(65) Prior Publication Data

US 2019/0098190 A1 Mar. 28, 2019

(30) Foreign Application Priority Data

Sep. 22, 2017 (JP) .................. 2017-182489

(51) Int. Cl.
| | |
|---|---|
| *H04N 5/225* | (2006.01) |
| *H04N 5/232* | (2006.01) |
| *G06F 1/16* | (2006.01) |
| *G06F 3/0484* | (2013.01) |
| *H04M 1/02* | (2006.01) |
| *G06F 3/0481* | (2013.01) |
| *G06F 3/0488* | (2013.01) |

(52) U.S. Cl.
CPC ..... *H04N 5/225251* (2018.08); *G06F 1/1626* (2013.01); *G06F 1/1632* (2013.01); *G06F 1/1686* (2013.01); *G06F 3/04847* (2013.01); *H04M 1/0264* (2013.01); *H04N 5/2257* (2013.01); *H04N 5/232933* (2018.08); *H04N 5/232939* (2018.08); *G06F 3/0488* (2013.01); *G06F 3/04817* (2013.01)

(58) Field of Classification Search
CPC ........... H04N 5/225251; H04N 5/2257; H04N 5/23293; H04N 5/232933; H04N 5/232935; H04N 5/232939; H04M 1/0264; G06F 1/1632; G06F 1/1686; G06F 3/04817; G06F 3/04847; G06F 3/0488
See application file for complete search history.

(56) References Cited

U.S. PATENT DOCUMENTS 9,357,126 B2 5/2016 Ishii et al.
10,171,736 B2 * 1/2019 Ito .................. H04N 5/23209
(Continued)

FOREIGN PATENT DOCUMENTS

JP 2014175729 A 9/2014

*Primary Examiner* — Daniel M Pasiewicz
(74) *Attorney, Agent, or Firm* — Rossi, Kimms & McDowell LLP

(57) ABSTRACT

A display apparatus performs shooting in a linked manner with an image pickup apparatus attachable to the display apparatus, to thereby prevent deterioration in operability. The display apparatus has a display unit, and a control unit. The display unit displays an operating section used for receiving therethrough an operation of controlling an operation of the image pickup apparatus. The control unit changes a process corresponding to the operation received through the operating section, according to an attaching position of the image pickup apparatus.

15 Claims, 28 Drawing Sheets

(56) References Cited

U.S. PATENT DOCUMENTS

| | | | |
|---|---|---|---|
| 2016/0119552 A1* | 4/2016 | Oh | G06F 3/0412 348/333.06 |
| 2016/0295090 A1* | 10/2016 | Ito | G03B 17/02 |
| 2016/0309088 A1* | 10/2016 | Ito | H04N 5/772 |
| 2018/0188635 A1* | 7/2018 | Wang | H04N 5/225 |

* cited by examiner

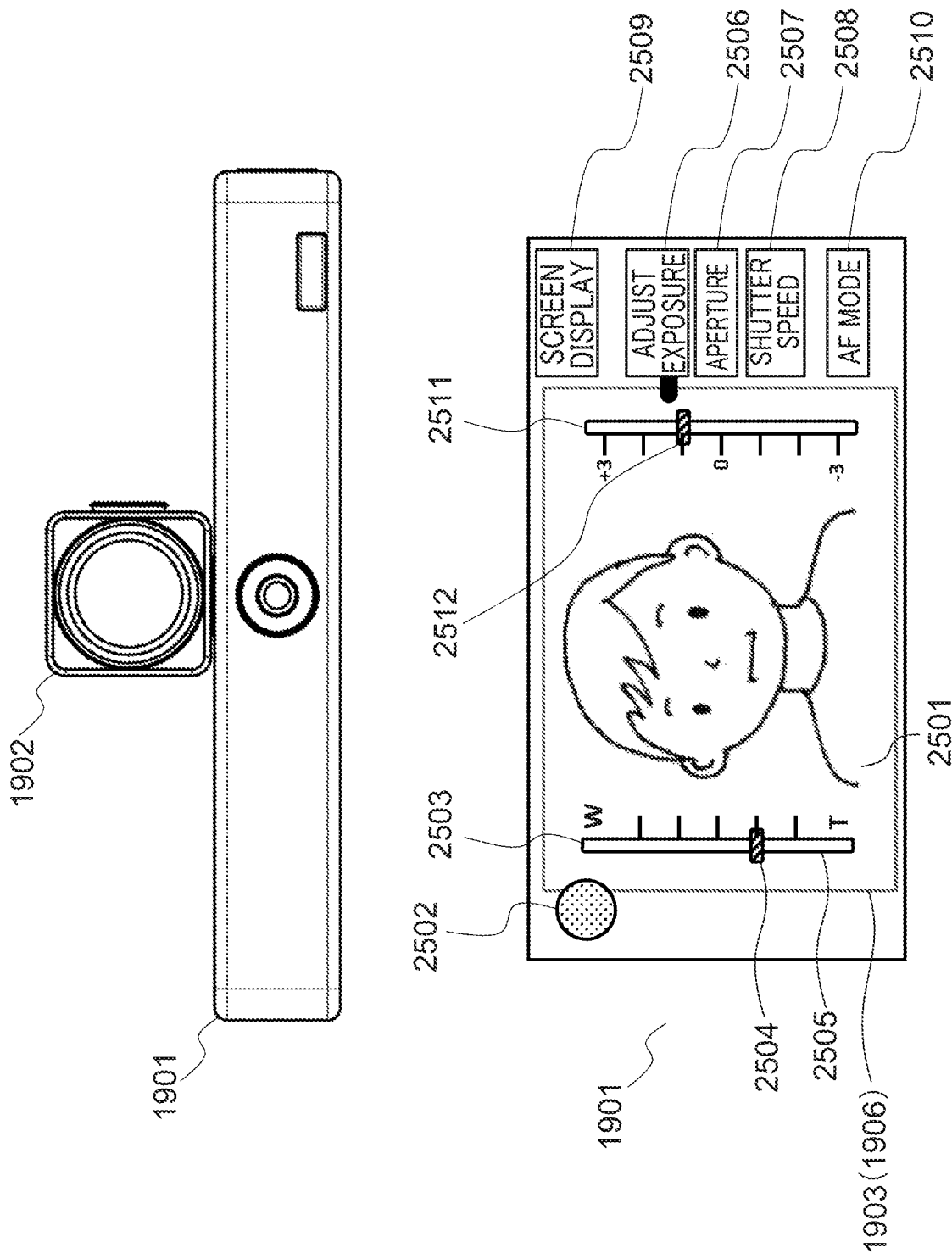

DISPLAY APPARATUS FOR DISPLAYING OPERATING SECTION FOR RECEIVING OPERATION, IMAGE PICKUP APPARATUS, IMAGE PICKUP SYSTEM, CONTROL METHOD OF DISPLAY APPARATUS, AND STORAGE MEDIUM

BACKGROUND OF THE INVENTION

Description of the Related Art

The present invention relates to a display apparatus, an image pickup apparatus, an image pickup system, a control method of a display apparatus, and a storage medium.

There has been known a digital camera including: an image pickup apparatus having an image pickup device; and a display apparatus having an operation unit, the image pickup apparatus and the display apparatus being detachable. With this digital camera, the image pickup apparatus and the display apparatus operate in a linked manner through wireless communication and can perform shooting in both the detached state and the joined state. In addition, there has also been proposed a digital camera which links an image pickup apparatus with an external apparatus such as a smartphone instead of a display apparatus and uses the external apparatus as both a display apparatus and an operation apparatus. For such a digital camera, there has been proposed a technique of switching an operation mode of each apparatus according to whether the image pickup apparatus and the display apparatus (or external apparatus) are in the detached state or the joined state (for example, Japanese Laid-Open Patent Publication (Kokai) No. 2014-175729). Furthermore, Japanese Laid-Open Patent Publication (Kokai) No. 2014-175729 discloses an image pickup operation terminal that stores a plurality of pieces of application software to be executed according to a physical contact state with an image pickup apparatus and selects suitable application software according to the physical contact position of the image pickup apparatus.

In such a digital camera, since the degree of freedom for the position of attaching the image pickup apparatus to the display apparatus is high, the image pickup apparatus may, for example, be attached near the operation unit of the display apparatus. A user holds the image pickup apparatus with one hand and holds the display apparatus with the other hand, but if the image pickup apparatus is attached near the operation unit, the user needs to operate the operation unit with the hand which is holding the image pickup apparatus. However, since the operation unit is arranged on the display apparatus, the hand (mainly fingers) holding the image pickup apparatus cannot reach the operation unit, and thus it is difficult to operate the operation unit and there is a risk of deterioration in operability.

SUMMARY OF THE INVENTION

The present invention provides a display apparatus, an image pickup apparatus, an image pickup system, a control method of a display apparatus, and a storage medium, which are capable of preventing deterioration in operability.

Accordingly, the present invention provides a display apparatus that performs shooting in a linked manner with an image pickup apparatus attachable to the display apparatus, the display apparatus comprising: a display unit; and a control unit, wherein the display unit is configured to display an operating section used for receiving therethrough an operation of controlling an operation of the image pickup apparatus, and the control unit is configured to change a process corresponding to the operation received through the operating section, according to an attaching position of the image pickup apparatus.

According to the present invention, it is possible to prevent deterioration in operability.

Further features of the present invention will become apparent from the following description of exemplary embodiments with reference to the attached drawings.

BRIEF DESCRIPTION OF THE DRAWINGS

FIG. 25 is a view showing an operation UI of the information terminal in the connection mode shown in FIG. 22C and FIG. 22D.

DESCRIPTION OF THE EMBODIMENTS

The present invention will now be described in detail with reference to the drawings. However, the configurations described in the following embodiments are merely examples, and the scope of the present invention is not limited by the configurations described in the embodiments. First, the first embodiment of the present invention will be described.

Figure 1A:
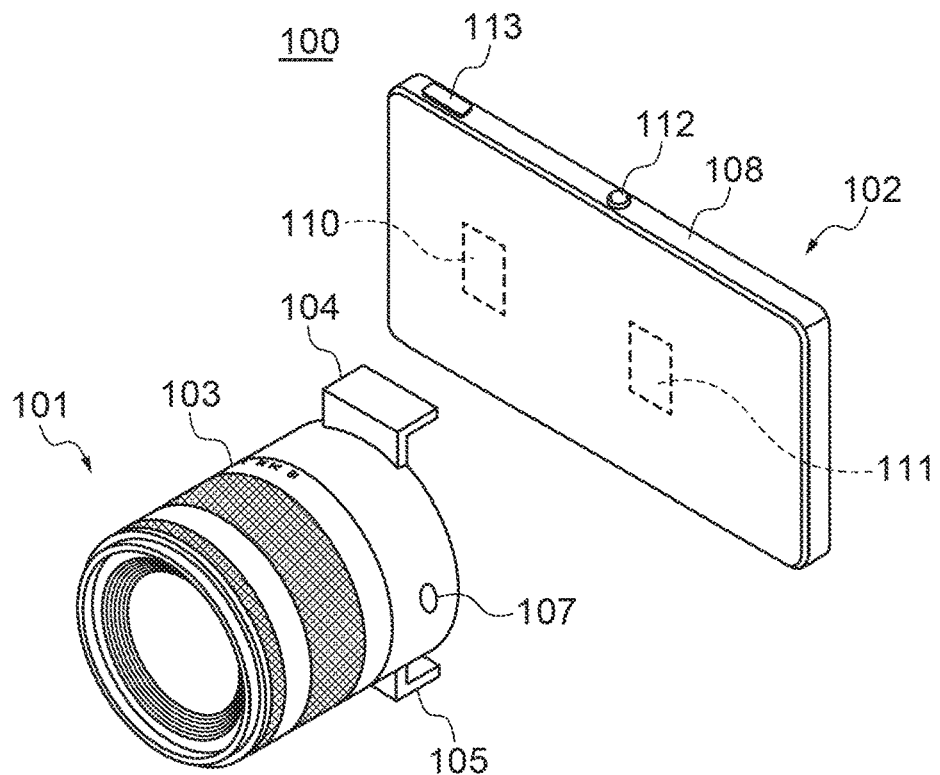
FIG. 1A and FIG. 1B are views showing a configuration of an image pickup system according to a first embodiment of the present invention.
Figure 1B:
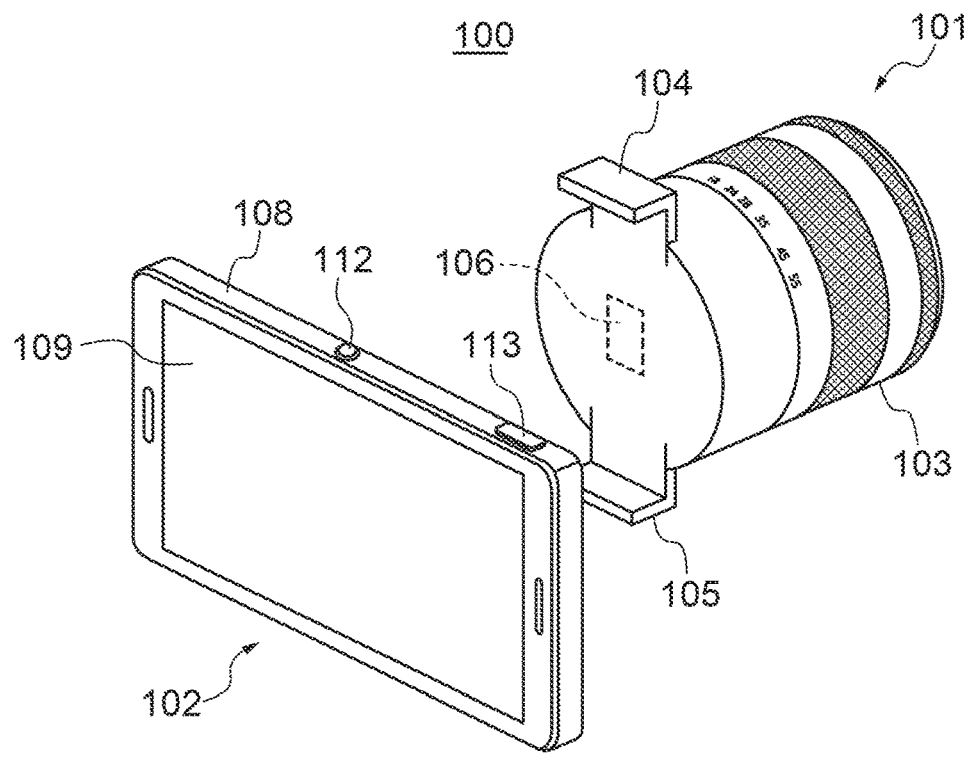

FIG. 1A and FIG. 1B are views showing a configuration of an image pickup system according to the first embodiment of the present invention. An image pickup system 100 includes a camera head 101 as an image pickup apparatus, and a smartphone 102 as a display apparatus. The camera head 101 is configured to be joined with and detached from the smartphone 102. Further, as will be described later, the camera head 101 operates in a linked manner with the smartphone 102 through wireless communication, for example, NFC (Near Field Communication), and can perform shooting in both the detached state and the joined state. FIG. 1A is a perspective view of the image pickup system 100 viewed from the camera head 101 side when the camera head 101 and the smartphone 102 are in the detached state. FIG. 1B is a perspective view of the image pickup system 100 viewed from the smartphone 102 side when the camera head 101 and the smartphone 102 are in the detached state.

The camera head 101 has a substantially cylindrical casing 103, and one end of the casing 103 is provided with a pair of engagement claws 104, 105 arranged symmetrically with respect to the center line of the casing 103. Moreover, a contactless detection section 106 (see the broken line) is embedded in the vicinity of the center of one end of the casing 103. The engagement claws 104, 105 are configured to be capable of arbitrarily adjusting the interval therebetween and be joined with the smartphone 102 by sandwiching the smartphone 102 between the engagement claws 104, 105. Moreover, the camera head 101 has a power switch 107 for instructing to turn on/off the power of the camera head 101. The smartphone 102 includes a casing 108 in the shape of a flat box, and a display panel 109 (display unit) as a display composed of an LCD or an OLED arranged to entirely cover one side (back side) of the casing 108. Furthermore, on the other side (front side) of the casing 108, a right contactless detection section 110 and a left contactless detection section 111 are arranged and embedded with a space therebetween along a longitudinal direction (see the broken lines). When a user holds the smartphone 102 such that the longitudinal direction of the smartphone 102 is substantially horizontal and views the smartphone 102 from the back side (the display panel 109 side), the right contactless detection section 110 is located on the right of the casing 108 and the left contactless detection section 111 is located on the left of the casing 108. Furthermore, the smartphone 102 has a power switch 112 for instructing to turn on/off the power of the smartphone 102, and a release switch 113 for instructing a shooting operation. When a user holds the smartphone 102 such that the longitudinal direction of the smartphone 102 is substantially horizontal with the smartphone 102 viewed from the back side, the power switch 112 is located at a substantially center of the casing 108 and the release switch 113 is located near the right end of the casing 108.

Figure 2:
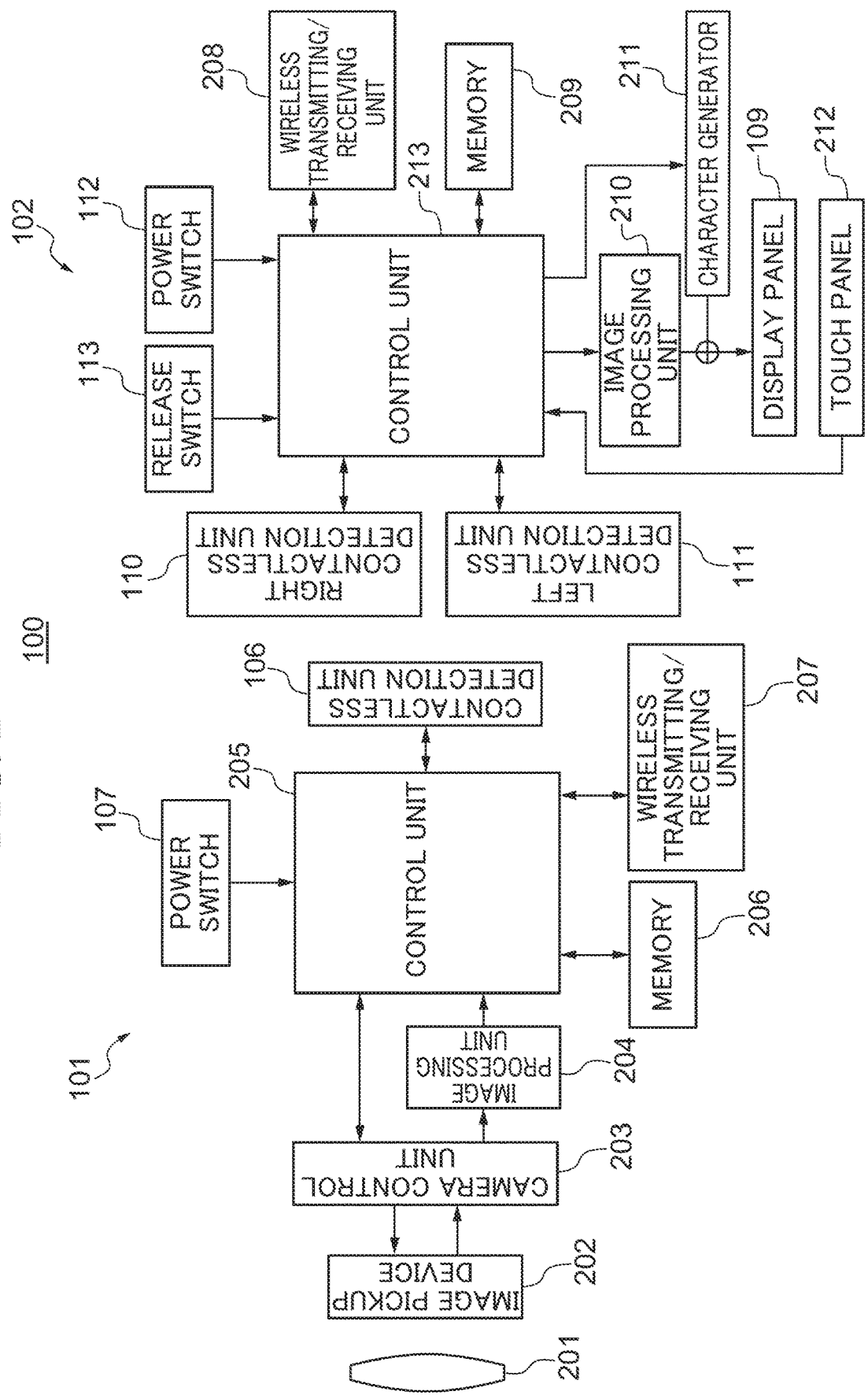
FIG. 2 is a block view schematically showing the configuration of the image pickup system of FIG. 1A and FIG. 1B.

FIG. 2 is a block diagram schematically showing the configuration of the image pickup system of FIG. 1A and FIG. 1B. In FIG. 2, the camera head 101 has a lens optical system 201, an image pickup device 202, a camera control unit 203, an image processing unit 204, a control unit 205, a memory 206, and a wireless transmitting/receiving unit 207 in addition to the contactless detection section 106 and the power switch 107. The operations of these components of the camera head 101 are controlled by the control unit 205. The image pickup device 202 is controlled by the camera control unit 203 and shoots a subject image through the lens optical system 201. The shot subject image is converted into predetermined image data by the image processing unit 204. The converted image data is stored in the memory 206 or transmitted to the outside of the camera head 101 through wireless communication such as Wi-Fi via the wireless transmitting/receiving unit 207 by the control unit 205.

The smartphone 102 has the display panel 109, the right contactless detection section 110, the left contactless detection section 111, the power switch 112, and the release switch 113. Furthermore, the smartphone 102 has a wireless transmitting/receiving unit 208 (transmitting unit), a memory 209, an image processing unit 210, a character generator 211, a touch panel 212, and a control unit 213 (control unit). The operations of these components of the smartphone 102 are controlled by the control unit 213. The display panel 109 decodes image data received from outside via the wireless transmitting/receiving unit 208, or image data stored in the memory 209, by the image processing unit 210, and displays the image data as an image. The character generator 211 generates an image of characters, and the display panel 109 displays the image of characters on the decoded image in a superimposed manner. The touch panel 212 is physically superimposed on the display panel 109, and the display panel 109 displays a graphical user interface (hereinafter referred to as the "UI") including the image of characters, etc., for receiving a user operation. The touch panel 212 receives the user operation by detecting a touch of the user on the image of a specific character in the UI.

When shooting is performed by the image pickup system 100, the smartphone 102 transmits from the wireless transmitting/receiving unit 208 to the camera head 101 a shooting command that is a control command corresponding to the user operation on the touch panel 212 or the release switch 113. The camera head 101 receives the transmitted shooting command by the wireless transmitting/receiving unit 207, and the control unit 205 controls the operations of the components of the camera head 101 according to the shooting command to perform shooting. Thereafter, the camera head 101 transmits the image data of the shot subject image from the wireless transmitting/receiving unit 207 to the smartphone 102. The smartphone 102 receives the transmitted image data by the wireless transmitting/receiving unit 208, and the control unit 213 displays the received image data on the display panel 109, or stores the received image data in the memory 209. In short, the camera head 101 and the smartphone 102 perform shooting in a linked manner within a range in which wireless communication can be performed by the wireless transmitting/receiving units 207, 208. It should be noted that the camera head 101 and the smartphone 102 can perform shooting in both the detached state and the joined state as long as the camera head 101 and the smartphone 102 are within a range where wireless communication can be performed by the wireless transmitting/receiving units 207, 208. Hence, when performing shooting, since the restrictions on the positions and attitudes of the camera head 101 and the smartphone 102 can be reduced, it is possible to improve the convenience of shooting. In particular, since shooting can be performed even in the detached state, it is possible to expand the range shootable by the image pickup system 100.

In the image pickup system 100, the contactless detection section 106 of the camera head 101 and the right contactless detection section 110 and the left contactless detection section 111 of the smartphone 102 communicate through a short-range wireless communication technology using NFC. Each of the contactless detection sections 106, 110, 111 has an antenna for transmitting and receiving communication data, and a transmitting/receiving unit for encoding and decoding communication data (none of which are shown). In addition, each of the contactless detection sections 106, 110, 111 has a reader/writer function for exchanging information with another contactless detection section or IC tag. Here, with the short-range wireless communication technology using weak radio waves reaching only about ten and several centimeters, the proximity status between the camera head 101 and the smartphone 102 can be determined depending on the radio wave reception conditions by the respective contactless detection sections 106, 110, 111.

As described above, while the contactless detection section 106 is arranged near the center of one end of the casing 103 of the camera head 101, the proximity status of another contactless detection section or IC tag (hereinafter simply referred to as "the proximity status of other device") determined by the contactless detection section 106 is transmitted to the control unit 205. The control unit 205 controls the operations of the components of the camera head 101, based on the transmitted proximity status of other device. As described above, the right contactless detection section 110 and the left contactless detection section 111 are arranged spaced apart from each other along the longitudinal direction of the casing 108 of the smartphone 102. Here, the right contactless detection section 110 is arranged closer to the release switch 113 than the left contactless detection section 111. The proximity status of another device determined by the right contactless detection section 110 and the left contactless detection section 111 is transmitted to the control unit 213. The control unit 213 controls the operations of the components of the smartphone 102, based on the transmitted proximity status of other device. That is, in the image pickup system 100, when the camera head 101 approaches a point of ten and several centimeters to the smartphone 102, or when the camera head 101 is joined with the smartphone 102, the camera head 101 and the smartphone 102 operate in a linked manner through NFC. In particular, when the camera head 101 is located closer to the right contactless detection section 110 than to the left contactless detection section 111, the contactless detection section 106 performs short-range wireless communication with the right contactless detection section 110. Whereas, when the camera head 101 is located closer to the left contactless detection section 111 than to the right contactless detection section 110, the contactless detection section 106 performs short-range wireless communication with the left contactless detection section 111.

Figure 3A:
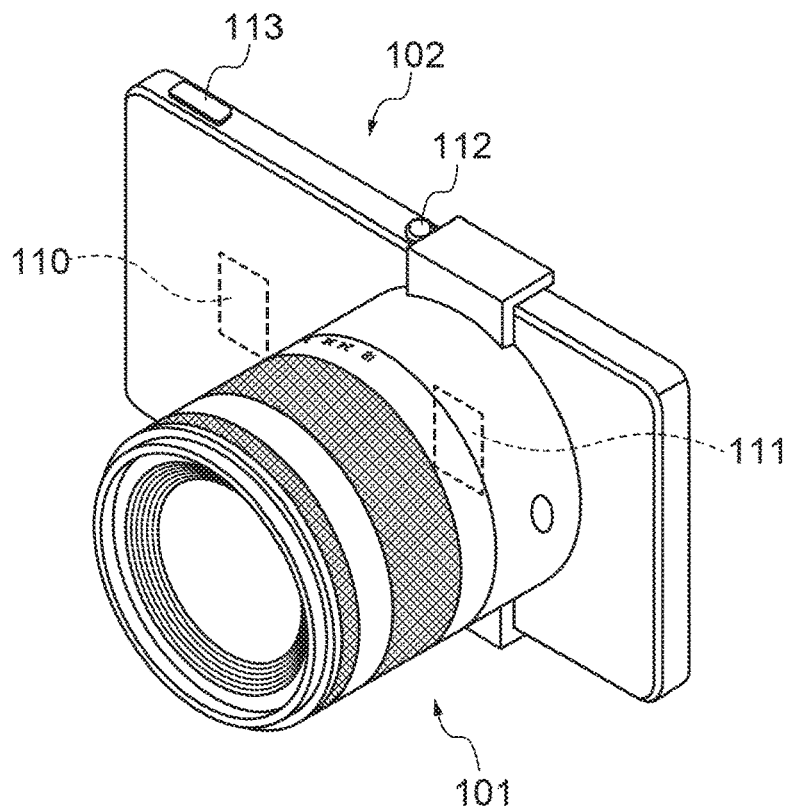
FIG. 3A and FIG. 3B are views showing a case where a camera head is joined with a smartphone such that the camera head is located near a left contactless detection section.
Figure 3B:
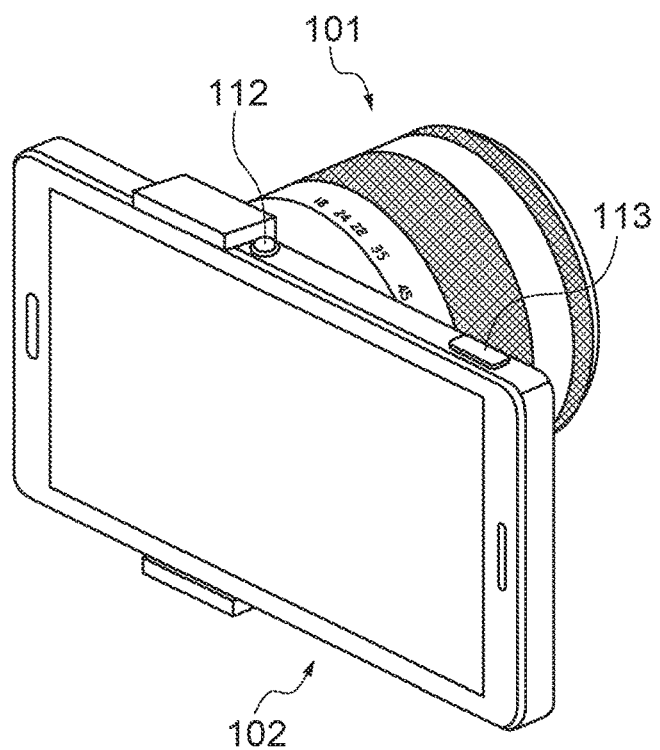
Figure 4A:
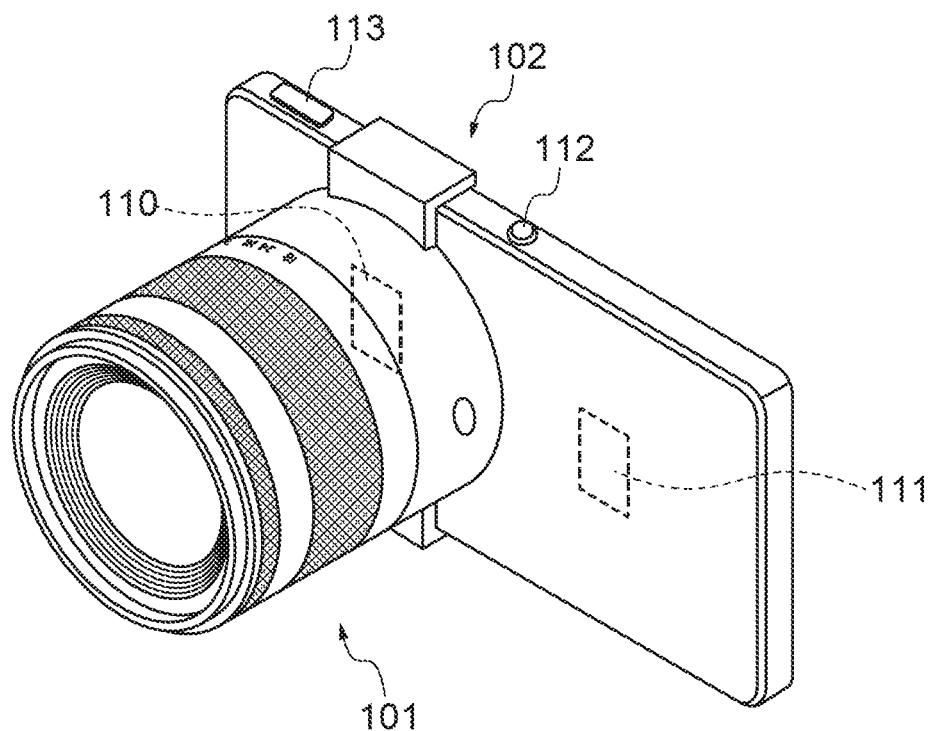
FIG. 4A and FIG. 4B are views showing a case where the camera head is joined with the smartphone such that the camera head is located near a right contactless detection section.
Figure 4B:
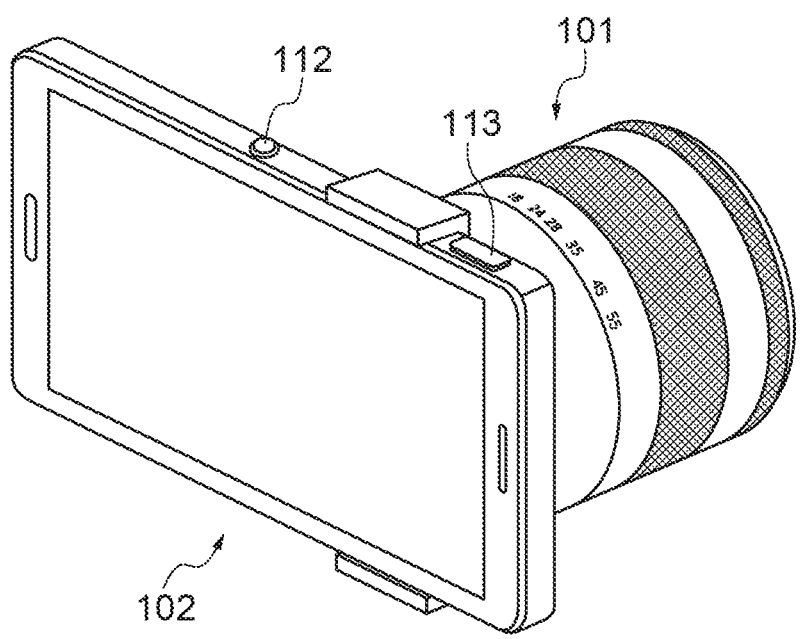

FIG. 3A and FIG. 3B are views showing a case where the camera head 101 is joined with the smartphone 102 such that the camera head 101 is located closer to the left contactless detection section 111 than to the right contactless detection section 110. In this case, that is, the case where the camera head 101 is joined with the smartphone 102 while being spaced apart from the release switch 113, the contactless detection section 106 performs short-range wireless communication with the left contactless detection section 111. FIG. 4A and FIG. 4B are views showing a case where the camera head 101 is joined with the smartphone 102 such that the camera head 101 is located closer to the right contactless detection section 110 than to the left contactless detection section 111. In this case, that is, the case where the camera head 101 is joined with the smartphone 102 such that the camera head 101 is in close proximity to the release switch 113, the contactless detection section 106 performs short-range wireless communication with the right contactless detection section 110. In other words, it is possible to determine whether the camera head 101 is located in close proximity to the right contactless detection section 110 or in close proximity to the left contactless detection section 111, based on whether the contactless detection section 106 performs short-range wireless communication with the right contactless detection section 110 or with the left contactless detection section 111. That is, the right contactless detection section 110 and the left contactless detection section 111 also function as an attaching-position detecting unit configured to detect the attaching position of the camera head 101 with respect to the smartphone 102. Further, the contactless detection section 106 also functions as a position detecting unit configured to detect the relative position of the smartphone 102 to the camera head 101. It should be noted that whether the camera head 101 is located in close proximity to the right contactless detection section 110 or in close proximity to the left contactless detection section 111 is determined by the control unit 213.

Figure 5:
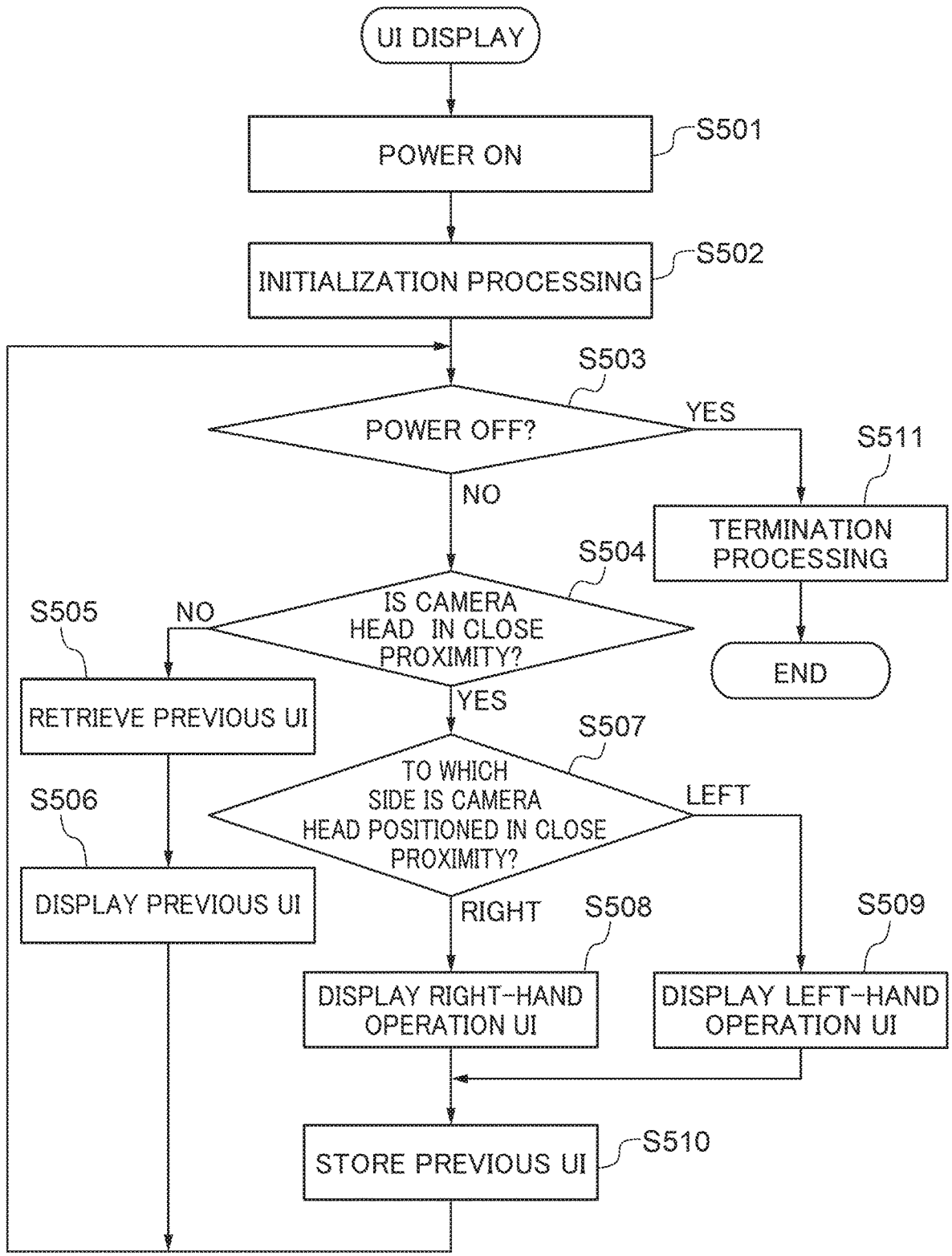
FIG. 5 is a flowchart showing a UI display process in the smartphone of the image pickup system.

Next, a UI display process in a smartphone as a control method of a display apparatus according to the present embodiment will be described. FIG. 5 is a flowchart showing the UI display process in the smartphone of the image pickup system. The process of FIG. 5 is realized, for example, by the control unit 213 executing a program stored in the memory 209.

First, when the power of the smartphone 102 is turned on based on an operation of the user to the power switch 112 (step S501), initialization processing that is necessary for activating the smartphone 102 is executed (step S502). At this time, if the camera head 101 is within a distance close enough to perform short-range wireless communication with the smartphone 102, the contactless detection section 106 starts short-range wireless communication with either of the right contactless detection section 110 and the left contactless detection section 111. Next, it is determined whether or not the power of the smartphone 102 has been turned off (step S503). It should be noted that the processing from step S503 onward is repeated at a predetermined timing. If the power of the smartphone 102 has not been turned off, it is determined whether or not the camera head 101 is within a distance close enough to perform short-range wireless communication with the smartphone 102 (step S504). More specifically, it is determined whether the contactless detection section 106 is performing short-range wireless communication with either of the right contactless detection section 110 and the left contactless detection section 111.

Figure 6A:
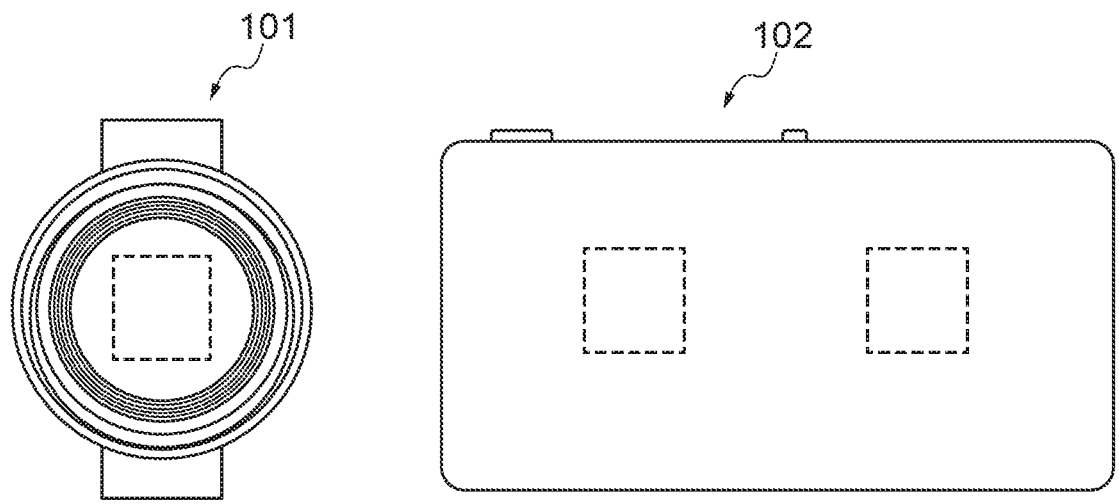
FIG. 6A and FIG. 6B are views showing a case where the camera head is not within a distance close enough to perform short-range wireless communication with the smartphone.
Figure 6B:
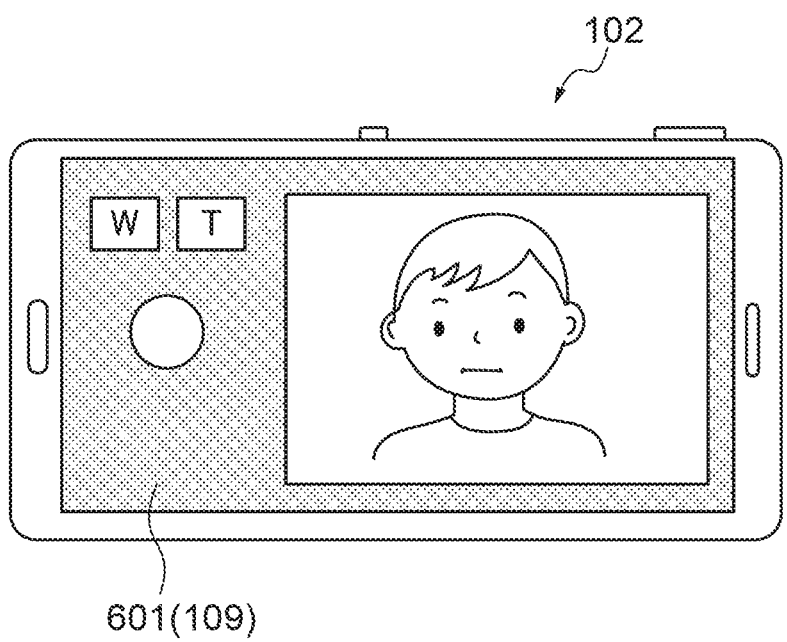

As shown in FIG. 6A, if the camera head 101 is not within a distance close enough to perform short-range wireless communication with the smartphone 102 (NO in step S504), the process proceeds to step S505. Next, image data of a UI (hereinafter referred to as the "previous UI") 601 stored in the memory 209 is retrieved (step S505), and the previous UI 601 is displayed on the display panel 109 (step S506) (FIG. 6B). Thereafter, the process returns to step S503. The previous UI 601 is the UI displayed on the display panel 109 in the previous process of FIG. 5 which is executed immediately before executing the current process of FIG. 5, and the previous UI 601 is stored in the memory 209 at the time the previous process of FIG. 5 is completed. For example, if a left-hand operation UI 801, which will be described later, is displayed on the display panel 109 in the previous process of FIG. 5, then the left-hand operation UI 801 is stored as the previous UI 601 in the memory 209, and the left-hand operation UI 801 is displayed in step S506. If a right-hand operation UI 701, which will be described later, is displayed on the display panel 109, then the right-hand operation UI 701 is stored as the previous UI 601 in the memory 209, and the right-hand operation UI 701 is displayed in step S506.

Figure 7A:
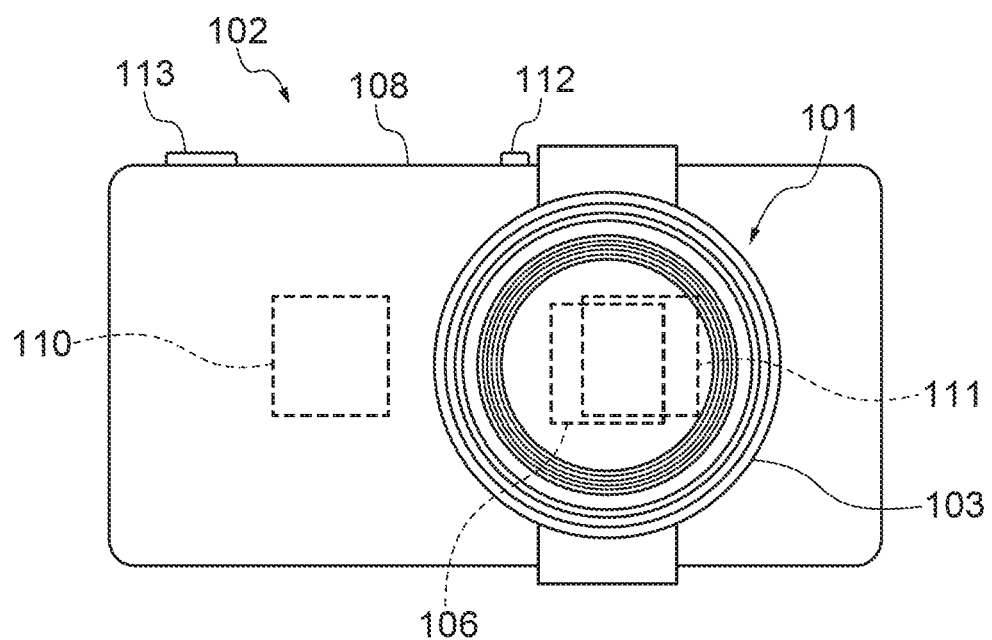
FIG. 7A and FIG. 7B are views showing a case where the longitudinal direction of the smartphone is held substantially horizontally and the camera head is in close proximity to the left contactless detection section.
Figure 7B:
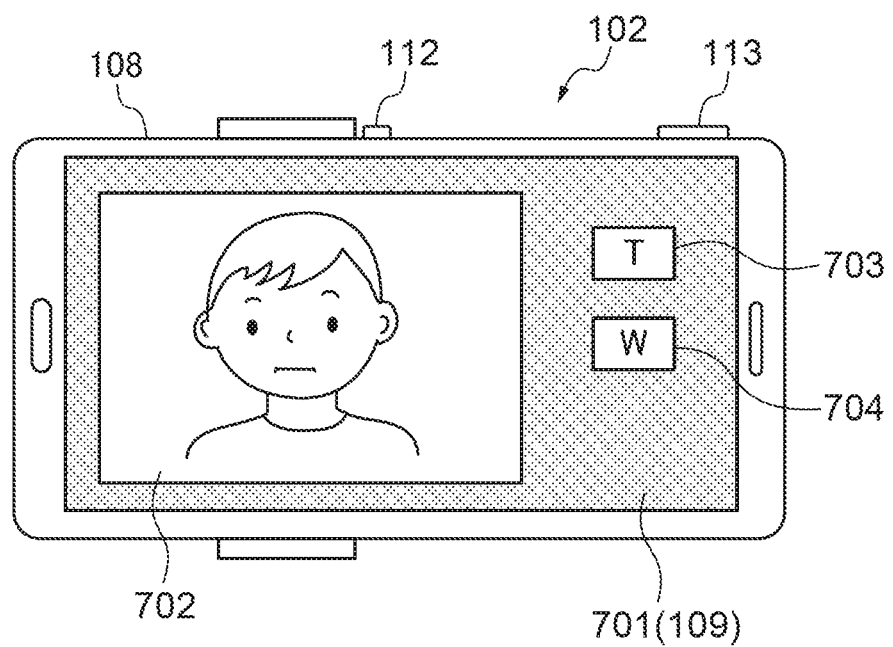

If it is determined that the camera head 101 is within a distance close enough to perform short-range wireless communication with the smartphone 102 (YES in step S504), the process proceeds to step S507. Next, it is determined whether the camera head 101 is located in close proximity to the right contactless detection section 110 or in close proximity to the left contactless detection section 111 (step S507). When the camera head 101 is located in close proximity to the left contactless detection section 111 (FIG. 7A), the control unit 213 displays the right-hand operation UI 701 (FIG. 7B) on the display panel 109 (step S508). As shown in FIG. 7A, when the camera head 101 is located in close proximity to the left contactless detection section 111, the user holds the casing 103 of the camera head 101 with the left hand and holds the right side of the casing 108 of the smartphone 102 with the right hand. Moreover, as described above, when the smartphone 102 is held such that the longitudinal direction of the smartphone 102 is substantially horizontal and is viewed from the back side, the release switch 113 is located near the right end of the casing 108. Therefore, the user can press the release switch 113 with the right hand which is holding the casing 108. Correspondingly, the smartphone 102 does not ignore the depression of the release switch 113, and does not display a release button for instructing shooting on the display panel 109. More specifically, the right-hand operation UI 701 has only a camera-through image 702 for subject confirmation, and operation icons 703, 704 for view-angle adjustment. The camera-through image 702 for subject confirmation is displayed on the display panel 109 at a position opposed to the camera head 101. Hence, since the subject and the camera-through image 702 can be placed at opposed positions, the user can perform shooting naturally without being conscious of a positional deviation between the subject image and the camera-through image 702. The operation icons 703, 704 are displayed near the release switch 113 on the display panel 109. Consequently, the user can touch the operation icons 703, 704 with the right hand which is holding the casing 108. When the release switch 113 is pressed by the user, the smartphone 102 and the camera head 101 operate in a linked manner and perform shooting. More specifically, in response to the depression of the release switch 113, the control unit 213 transmits a shooting command from the wireless transmitting/receiving unit 208 to the camera head 101. Then, the camera head 101 receives the transmitted shooting command by the wireless transmitting/receiving unit 207, and the control unit 205 performs shooting according to the shooting command and further transmits the image data of the shot subject image from the wireless transmitting/receiving unit 207 to the smartphone 102. Thereafter, the right-hand operation UI 701 is stored as the previous UI 601 in the memory 209 (step S510), and the process returns to step S503.

Figure 8A:
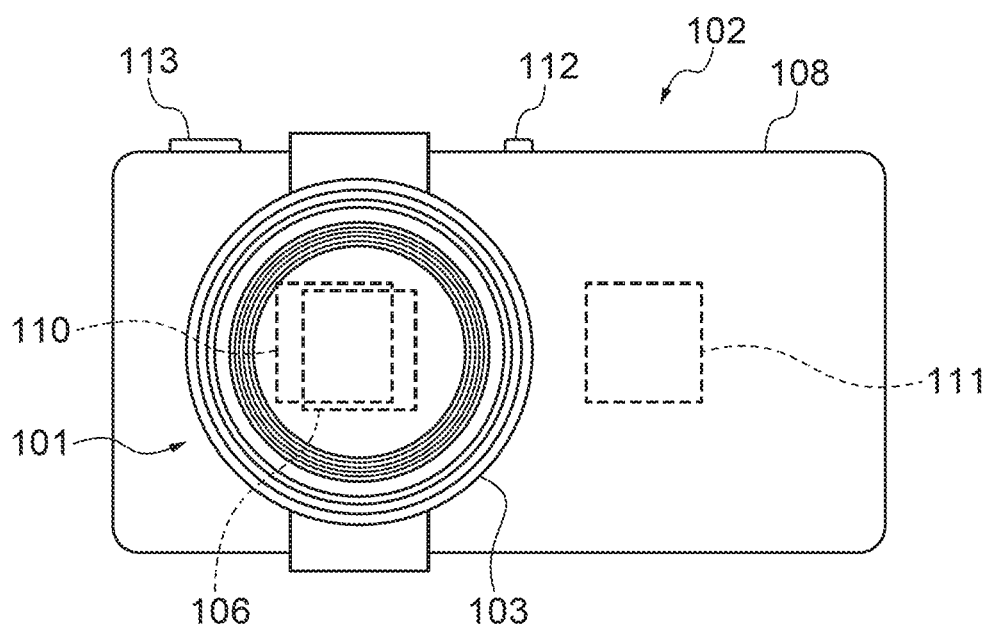
FIG. 8A and FIG. 8B are views showing a case where the longitudinal direction of the smartphone is held substantially horizontally and the camera head is in close proximity to the right contactless detection section.
Figure 8B:
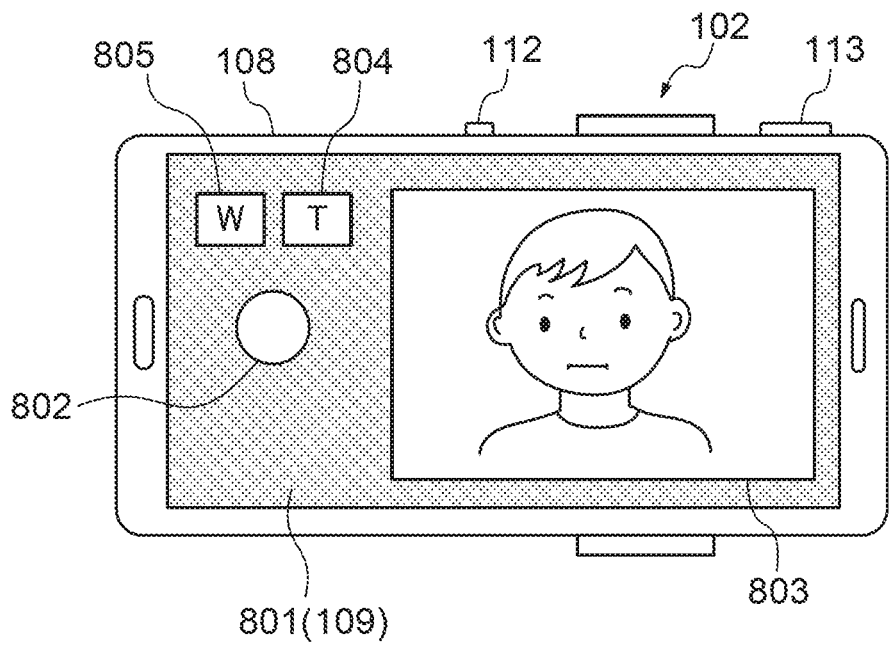

When it is determined as a result in step S507 that the camera head 101 is located in close proximity to the right contactless detection section 110 (FIG. 8A), the control unit 213 displays the left-hand operation UI 801 on the display panel 109 (FIG. 8B) (step S509). As shown in FIG. 8A, when the camera head 101 is located in close proximity to the right contactless detection section 110, the user holds the casing 103 of the camera head 101 with the right hand and holds the left side of the casing 108 of the smartphone 102 with the left hand. At this time, since the release switch 113 is away from the left hand, it is difficult for the user to press the release switch 113 with the left hand which is holding the casing 108. Correspondingly, the smartphone 102 ignores the depression of the release switch 113 and displays on the display panel 109 a release button 802 as an operation icon for instructing shooting. More specifically, the left-hand operation UI 801 has the release button 802 in addition to a camera-through image 803 for subject confirmation and operation icons 804, 805 for view-angle adjustment. The camera-through image 803 for subject confirmation is displayed on the display panel 109 at a position opposed to the camera head 101. The operation icons 804, 805 and the release button 802 are spaced apart from the release switch 113 on the display panel 109 and displayed on the left side in the display panel 109 as shown in FIG. 8B. Hence, the user can touch the operation icons 804, 805 and the release button 802 with the left hand which is holding the casing 108. When the release button 802 is touched by the user, the smartphone 102 and the camera head 101 operate in a linked manner and perform shooting. More specifically, in response to the touching of the release button 802, the control unit 213 transmits a shooting command from the wireless transmitting/receiving unit 208 to the camera head 101. Then, the camera head 101 receives the transmitted shooting command by the wireless transmitting/receiving unit 207, and the control unit 205 performs shooting according to the shooting command and further transmits the image data of the shot subject image from the wireless transmitting/receiving unit 207 to the smartphone 102. Here, as described above, the depression of the release switch 113 is ignored, and therefore, even when the release switch 113 is pressed by the user, the smartphone 102 and the camera head 101 do not operate in a linked manner and perform shooting. It should be noted that the depression of the release switch 113 may be assigned to an instruction of another operation different from shooting, and, as the another operation to be assigned, it is preferable to assign an operation which is not directly related to the shooting operation and is less frequently used, such as, for example, calling a setting menu. Thereafter, the left-hand operation UI 801 is stored as the previous UI 601 in the memory 209 (step S510), and the process returns to step S503.

If it is determined in step S503 that the power of the smartphone 102 is off, termination processing for terminating the operation as the image pickup system 100, that is, the linked operation of the camera head 101 and the smartphone 102, is performed (step S511). In the termination processing, not only the linked operation of the camera head 101 and the smartphone 102 is terminated, but also storing of data which has not been stored in the memory 209 and termination of short-range wireless communication are performed. Thereafter, the present process is terminated. The termination processing in step S511 may be executed when the power of the camera head 101 is off instead of the smartphone 102, or when both the camera head 101 and the smartphone 102 are off According to the process of FIG. 5, when the camera head 101 is located in close proximity to the right contactless detection section 110, the left-hand operation UI 801 is displayed on the display panel 109. Since the left-hand operation UI 801 has the release button 802 displayed on the left side in the display panel 109, the user can instruct shooting by touching the release button 802 with the left hand which is holding the casing 108. Hence, it is possible to eliminate the need for the user to press the release switch 113 located near the right end of the casing 108 with the left hand in order to instruct shooting, and consequently it is possible to prevent deterioration in the operability of the smartphone 102 when performing shooting.

In the process of FIG. 5, when the camera head 101 is located in close proximity to the left contactless detection section 111, the right-hand operation UI 701 is displayed on the display panel 109, whereas when the camera head 101 is located in close proximity to the right contactless detection section 110, the left-hand operation UI 801 is displayed on the display panel 109. That is, the UI to be displayed on the display panel 109 is changed according to the attaching position of the camera head 101 onto the smartphone 102. When the UI is changed, even if the same position on the display panel 109 is touched, an instruction (control command) for a different operation is transmitted to the camera head 101. For example, according to the attaching position of the camera head 101 onto the smartphone 102, the control command corresponding to the touch received at a location spaced apart from the attaching position of the camera head 101 is changed to a control command instructing shooting. Thus, it is possible to certainly eliminate the need to perform an operation for instructing shooting with the hand which is holding the camera head 101.

Moreover, in the process of FIG. 5, in the right-hand operation UI 701, the operation icons 703, 704 are displayed near the release switch 113, and, in the left-hand operation UI 801, the operation icons 804, 805 are displayed spaced apart from the release switch 113. That is, the operation icons 703, 704 and the operation icons 804, 805 are displayed on the display panel 109 at locations spaced apart from a position opposed to the camera head 101. Thus, it is possible to eliminate the need to touch the operation icons 703, 704 and the operation icons 804, 805 with the hand which is holding the camera head 101, and it is also possible to prevent deterioration of operability relating to view-angle adjustment.

Further, in the process of FIG. 5, even when the camera head 101 is not within a distance close enough to perform short-range wireless communication with the smartphone 102, the previous UI 601 is displayed on the display panel 109. Hence, it is possible to prevent occurrence of a situation where the UI for instructing shooting or view-angle adjustment is not displayed on the display panel 109.

In the process of FIG. 5, the control unit 213 of the smartphone 102 makes determinations in step S504 and step S505, but these determinations may be made by the control unit 205 of the camera head 101. At this time, the control unit 205 monitors the communication status of the contactless detection section 106, and determines whether the contactless detection section 106 is performing short-range wireless communication with one of the right contactless detection section 110 and the left contactless detection section 111 and transmits the determination result as determination information to the smartphone 102. The smartphone 102 changes the UI to be displayed on the display panel 109, based on the determination information received by the control unit 213.

Further, in the case where the control unit 213 of the smartphone 102 makes determinations in step S504 and step S505, the contactless detection section 106 of the camera head 101 may be replaced with a sticker type IC tag. Further, in the case where the control unit 205 of the camera head 101 makes the determinations in step S504 and step S505, the right contactless detection section 110 of the smartphone 102 and the smartphone 102 may be replaced with a sticker type IC tag. Whether or not the camera head 101 is attached to the smartphone 102 may be determined not only based on the communication status with the contactless detection section 106, the right contactless detection section 110, and the left contactless detection section 111, but also by another device. For example, the smartphone 102 or the camera head 101 may be provided with an attachment-detachment detection switch to detect the attached or detached state of the camera head 101 to/from the smartphone 102 by the detachment-attachment detection switch.

Figure 9A:
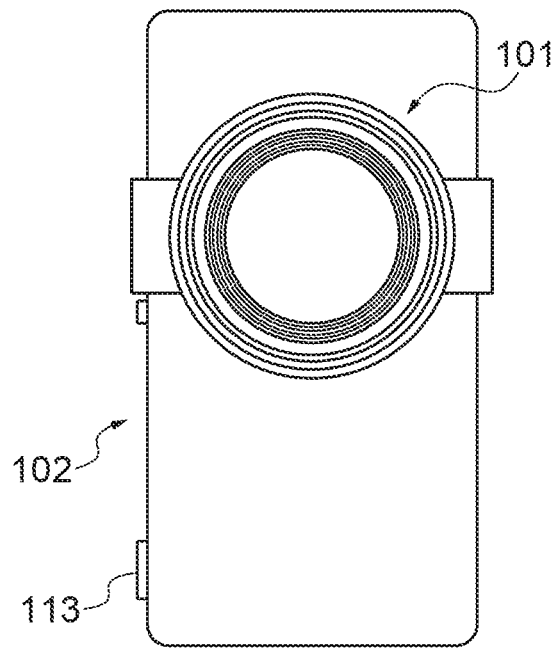
FIG. 9A and FIG. 9B are views showing a case where the longitudinal direction of the smartphone is held substantially vertically and the camera head is attached spaced apart from a release switch.
Figure 9B:
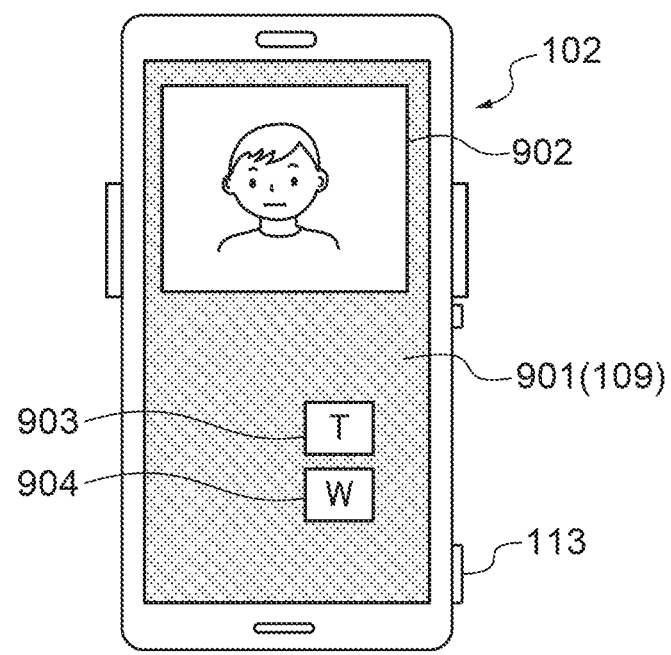

In the above-described embodiment, it is assumed that the smartphone 102 is held such that the longitudinal direction of the smartphone 102 is substantially horizontal, but the holding attitude of the smartphone 102 by the user in the shooting operation is not limited to this. For example, the smartphone 102 may be held such that the longitudinal direction of the smartphone 102 is substantially vertical. In this case, the UI to be displayed on the display panel 109 is also changed according to the attaching position of the camera head 101 onto the smartphone 102. For example, as shown in FIG. 9A, when the camera head 101 is attached spaced apart from the release switch 113 (FIG. 9A), the control unit 213 displays a spaced-situation operation UI 901 (operating section) (FIG. 9B) on the display panel 109. As shown in FIG. 9A, when the camera head 101 is attached spaced apart from the release switch 113, the user holds the camera head 101 with one hand (upper hand) and holds the lower portion of the smartphone 102 with the other hand (lower hand). At this time, the other hand is consequently away from the camera head 101 and is closer to the release switch 113. Hence, since the user can press the release switch 113 with the other hand, the smartphone 102 does not ignore the depression of the release switch 113 and does not display a release button for instructing shooting on the display panel 109. More specifically, in the spaced-situation operation UI 901, a camera-through image 902 is displayed at a position opposed to the camera head 101, and operation icons 903, 904 are displayed near the release switch 113 on the display panel 109.

Figure 10A:
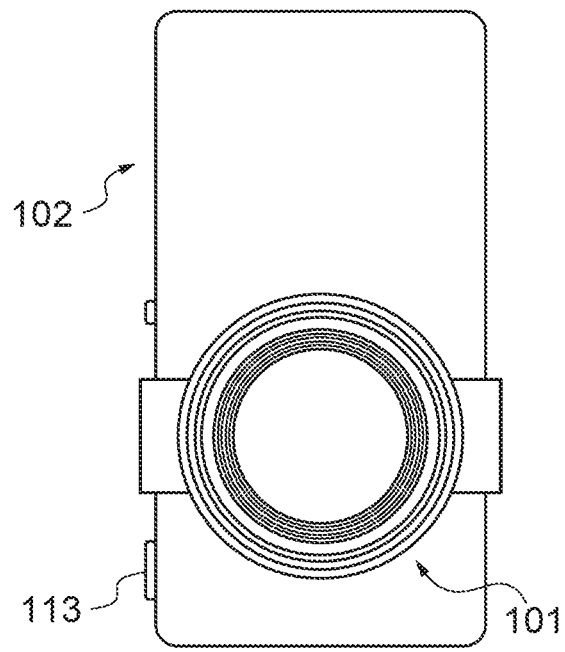
FIG. 10A and FIG. 10B are views showing a case where the longitudinal direction of the smartphone is held substantially vertically and the camera head is attached in close proximity to the release switch.
Figure 10B:
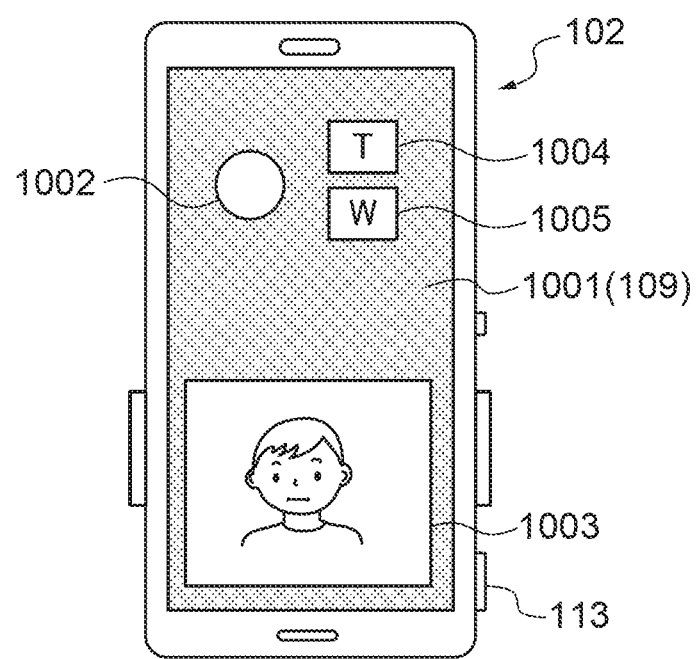

Moreover, for example, as shown in FIG. 10A, when the camera head 101 is attached in close proximity to the release switch 113 (FIG. 10A), the control unit 213 displays a proximity-situation operation UI 1001 (operating section) (FIG. 10B) on the display panel 109. As shown in FIG. 10A, when the camera head 101 is attached in close proximity to the release switch 113, the user holds the camera head 101 with one hand (lower hand) and holds the upper portion of the smartphone 102 with the other hand (upper hand). At this time, consequently, the other hand is away from the camera head 101 and also away from the release switch 113. Therefore, it is difficult for the user to press the release switch 113 with the other hand. Then, the smartphone 102 ignores the depression of the release switch 113 and displays a release button 1002 on the display panel 109. More specifically, in the proximity-situation operation UI 1001, a camera-through image 1003 is displayed at a position opposed to the camera head 101. In addition, operation icons 1004, 1005 and the release button 1002 are displayed collectively on the upper side in the display panel 109 while being spaced apart from the release switch 113 as shown in FIG. 10B.

Next, the second embodiment of the present invention will be described. Since the configurations and functions of the second embodiment are basically the same as those of the above-described first embodiment, redundant description of configurations and functions will be omitted, and different configurations and functions will be described below. In the first embodiment, the image pickup system 100 is configured with the camera head 101 and the smartphone 102. However, the second embodiment differs from the first embodiment in an aspect that the image pickup system is configured with a module assembling type information terminal.

Figure 11A:
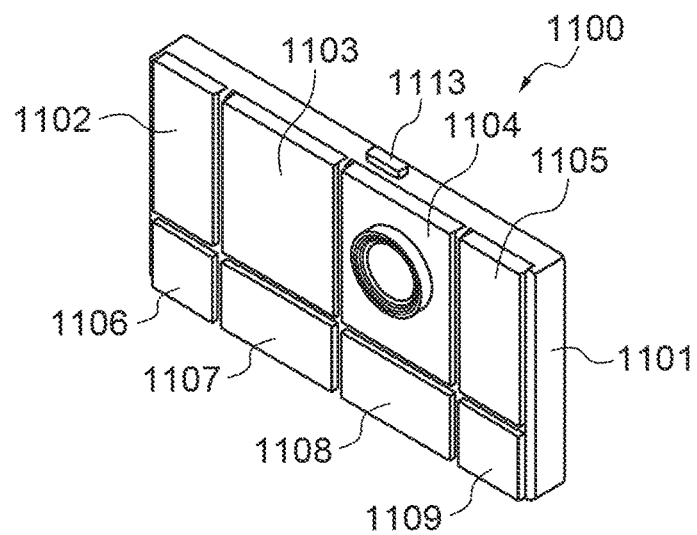
FIG. 11A to FIG. 11C are views showing a configuration of a module assembling type information terminal as an image pickup system according to a second embodiment of the present invention.
Figure 11B:
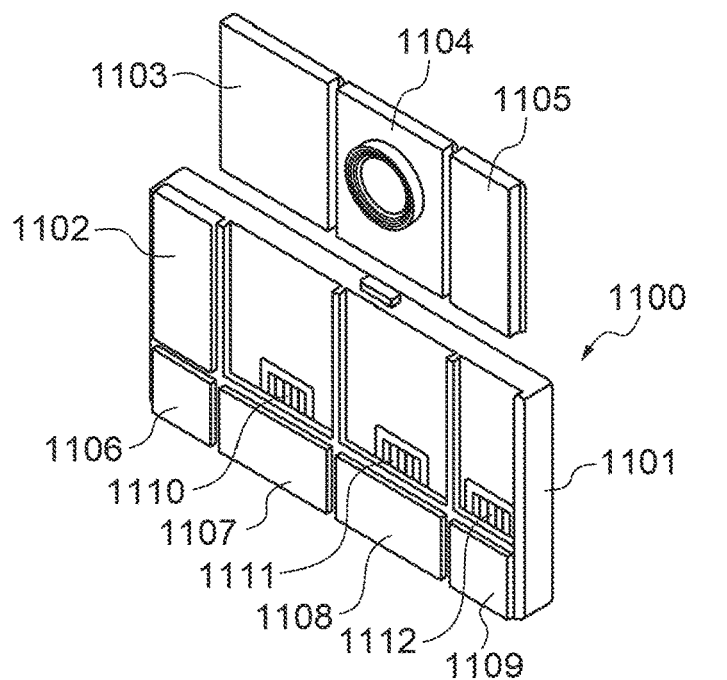
Figure 11C:
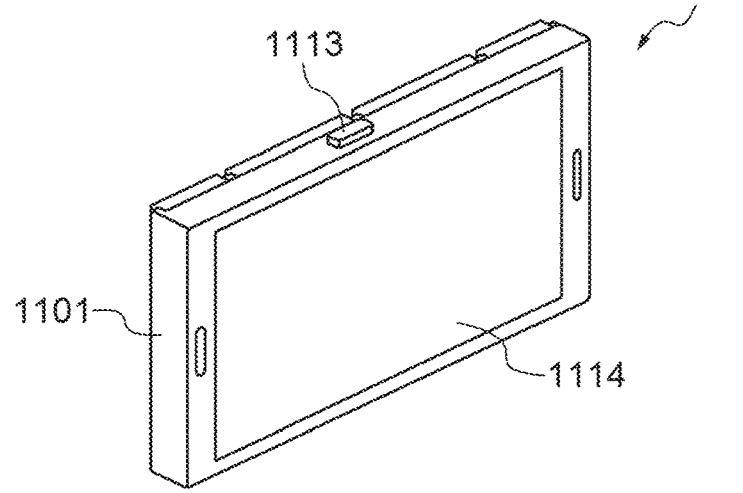

FIG. 11A to FIG. 11C are views showing the configuration of a module assembling type information terminal as an image pickup system according to the second embodiment of the present invention. A module assembling type information terminal (hereinafter simply referred to as the "information terminal") 1100 can execute various functions by attaching module units having mutually different functions to a base unit 1101 (display apparatus) in the form of a flat box. FIG. 11A is a perspective view when the information terminal 1100 in a state in which module units are attached is viewed from the module units side. FIG. 11B is a perspective view when the information terminal 1100 in a state in which some module units are detached is viewed from the module units side. FIG. 11C is a perspective view when the information terminal 1100 in a state in which the module units are attached is viewed from the opposite side to the module units.

As shown in FIG. 11A, in the information terminal 1100, for example, eight module units 1102 to 1109 are attached to the base unit 1101. Moreover, as shown in FIG. 11B, the information terminal 1100 has a plurality of module slots as interfaces for attaching the respective module units 1102 to 1109. Module slots 1110 to 1112 are shown as representative examples in FIG. 11B. In the information terminal 1100, the module unit 1105 (image pickup apparatus) is a module unit incorporating a camera and is attached to the module slot 1111. It should be noted that the module unit incorporating the camera is hereinafter referred to as the "camera unit". The other module units 1102 to 1104, and 1106 to 1109 correspond, for example, to a rechargeable battery unit, a storage medium unit, a Wi-Fi transmitting/receiving unit, and a GPS receiver. The units corresponding to the other module units 1102 to 1104, and 1106 to 1109 are not limited to these units.

Furthermore, the base unit 1101 has a power button 1113 for instructing to turn on/off the power of the information terminal 1100. The base unit 1101 is in the form of a flat box and has a display panel 1114 (display unit) as a display composed of an LCD or an OLED arranged to entirely cover one side (back side).

Figure 12:
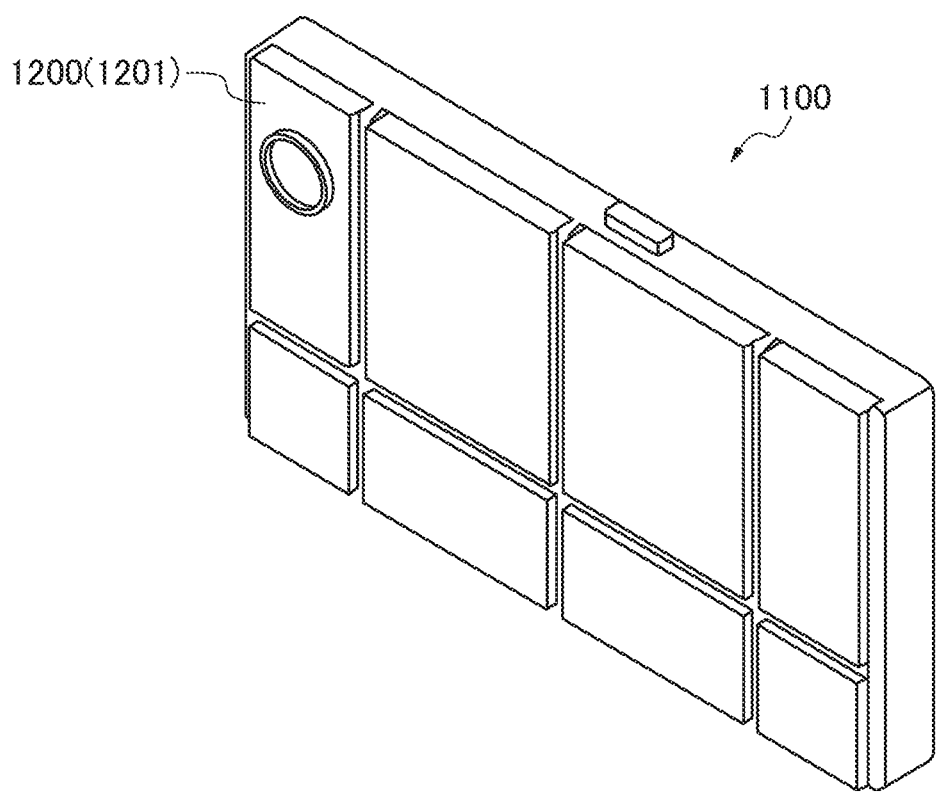
FIG. 12 is a view showing a configuration of a modified example of the information terminal of FIGS. 11A to 11C.

In the information terminal 1100, the arrangement of the module units with respect to the module slots is not particularly limited, and each module unit in each module slot is replaceable. Therefore, as shown in FIG. 12, it is also possible to attach a camera unit 1200 different from the camera unit 1104 to a module slot 1201 which is different from the module slot 1111. The camera unit 1104 and the camera unit 1200 are different not only in the module shape, but also, for example, in optical specifications such as the shooting angle of view and the number of stored pixels, and the user attaches one of the camera units to the base unit 1101 according to the shooting purpose. In the information terminal 1100, the shapes of the respective module units and the shapes of the respective module slots are standardized to some specifications, and if module units are of the same standard, these module units can be attached to any module slots of the corresponding standard.

Figure 13:
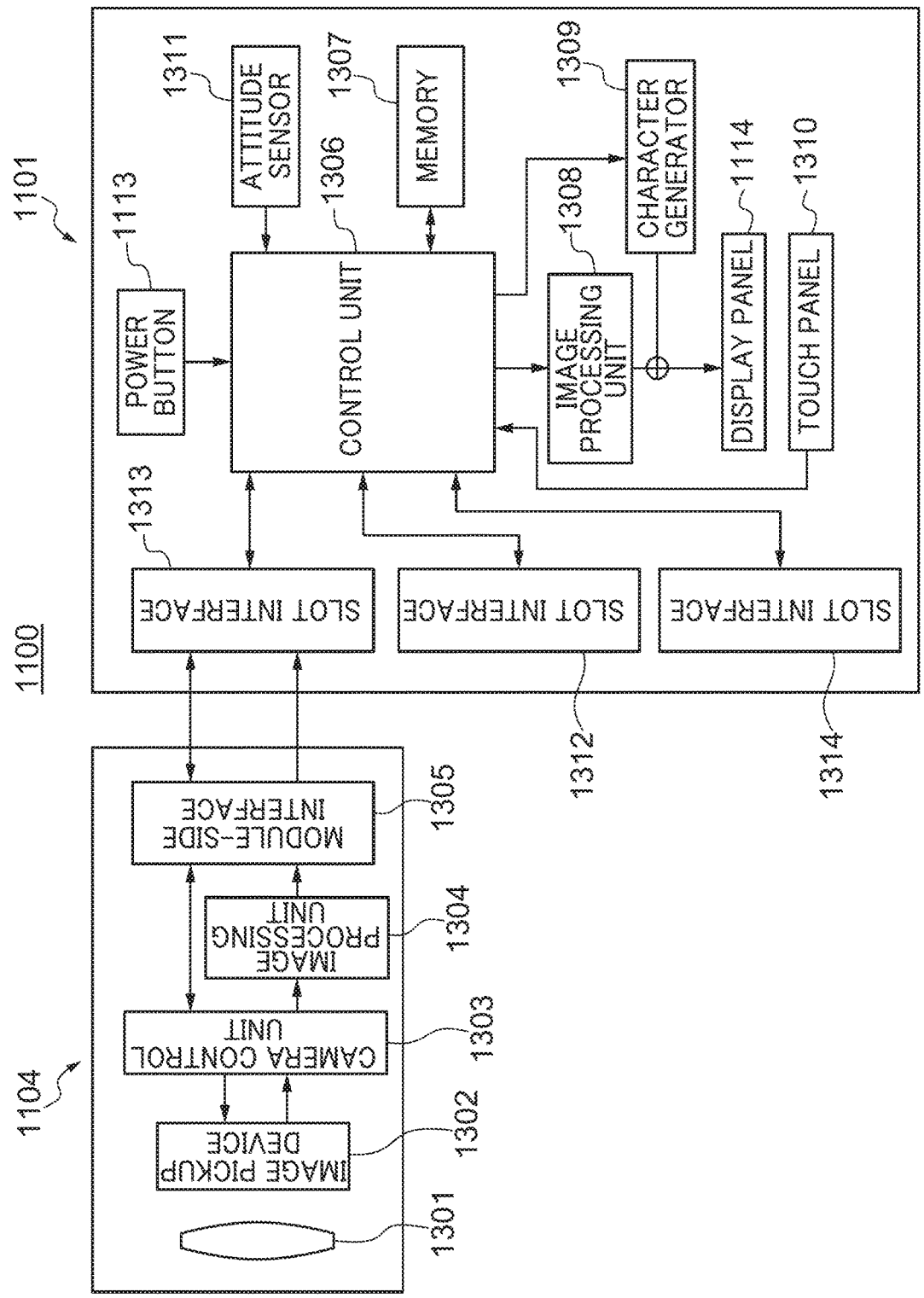
FIG. 13 is a block diagram schematically showing the configuration of the information terminal of FIGS. 11A to 11C.

FIG. 13 is a block diagram schematically showing the configuration of the information terminal of FIG. 11A to FIG. 11C. In FIG. 13, the camera unit 1104 has a lens optical system 1301, an image pickup device 1302, a camera control unit 1303, an image processing unit 1304, and a module-side interface (hereinafter abbreviated as the "module I/F") 1305. The operations of these components of the camera unit 1104 are controlled by the camera control unit 1303. The image pickup device 1302 is controlled by the camera control unit 1303 and shoots a subject image through the lens optical system 1301. The shot subject image is converted into predetermined image data by the image processing unit 1304. The converted image data is transmitted from the module I/F 1305 to the base unit 1101 by the camera control unit 1303. Since the camera unit 1200 has the same configuration as the camera unit 1104, the description is omitted. The base unit 1101 has a control unit 1306 (control unit), a memory 1307, an image processing unit 1308, and a character generator 1309 in addition to the power button 1113 and the display panel 1114. Moreover, the base unit 1101 has a touch panel 1310, an attitude sensor 1311 (attitude detecting unit), and a plurality of slot interfaces (hereinafter abbreviated as the "slot I/F"), for example, slot I/F 1312 to 1314 (transmitting unit). Each slot I/F is provided corresponding to each module slot, and transmits and receives, for example, control commands and image data to/from the module I/F of the module unit attached to the module slot. The operations of these components of the base unit 1101 are controlled by the control unit 1306. For example, the control unit 1306 performs a power on/off operation, activation processing and termination processing on the base unit 1101 and the module units in response to a user operation on the power button 1113. The memory 1307 stores application software to be executed by the information terminal 1100, parameters necessary for executing the software, and image data and text data. Data writing and data reading to/from the memory 1307 are controlled by the control unit 1306 based on an instruction of an OS (basic software) and a user operation. Further, the control unit 1306 can determine the attitude of the base unit 1101 (information terminal 1100) by the attitude sensor 1311. The display panel 1114 decodes image data received from the camera unit 1104 via the slot I/F 1313, or image data stored in the memory 1307, by the image processing unit 1308 and displays the image data as an image. The character generator 1309 generates an image of characters, and the display panel 1114 displays the image of characters superimposed on the decoded image. The touch panel 1310 is physically superimposed on the display panel 1114, and the display panel 1114 displays a UI including the image of characters, etc. for receiving a user operation. The touch panel 1310 detects a touch made by the user on the image of a specific character on the UI, and thereby receiving the user operation.

When performing shooting with the information terminal 1100, the base unit 1101 transmits a shooting command, which is a control command in response to the user operation on the touch panel 1310, from the slot I/F 1313 to the camera unit 1104. The camera unit 1104 receives the transmitted shooting command by the module I/F 1305, and the camera control unit 1303 controls the operations of the components of the camera unit 1104 according to the shooting command and performs shooting. Thereafter, the camera unit 1104 transmits the image data of the shot subject image from the module I/F 1305 to the base unit 1101. The base unit 1101 receives the transmitted image data by the slot I/F 1313, and the control unit 1306 displays the received image data on the display panel 1114, or stores the image data in the memory 1307. Thus, in the information terminal 1100, the camera unit 1104 is attached to the base unit 1101, and the camera unit 1104 and the base unit 1101 operate in a linked manner and perform shooting. Furthermore, in the base unit 1101, the control unit 1306 can determine to which module slot the camera unit 1104 is attached. Hence, the attaching position of the camera unit 1104 on the base unit 1101 can be determined.

Figure 14:
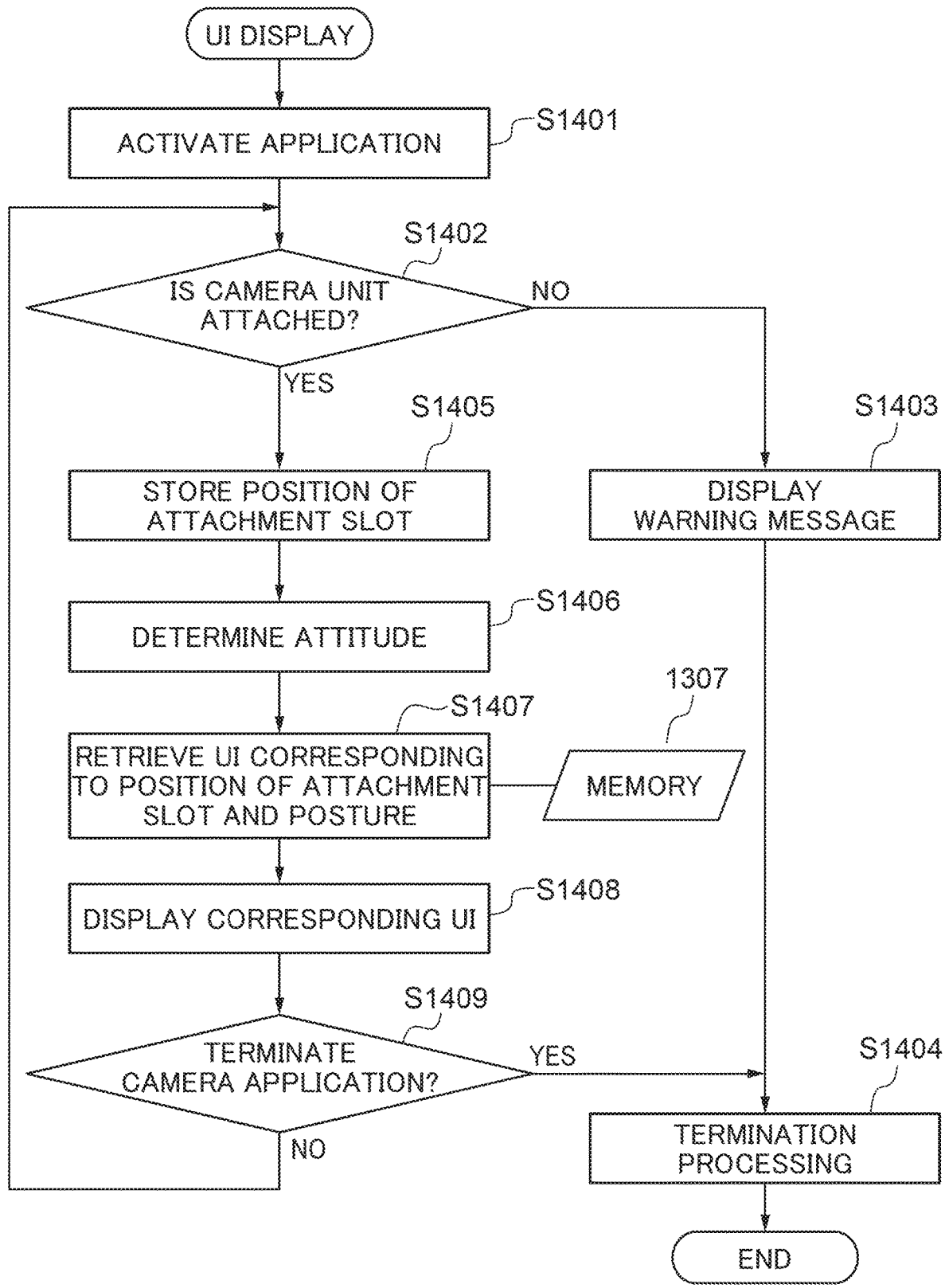
FIG. 14 is a flowchart showing a UI display process in a base unit of the information terminal.

Next, the following will describe a UI display process in the base unit 1101 as a control method for the display apparatus according to the present embodiment. FIG. 14 is a flowchart showing the UI display process in the base unit of the information terminal. The process of FIG. 14 is realized by the control unit 1306 executing, for example, a program stored in the memory 1307.

First, when activation of a camera application (hereinafter abbreviated as the "camera appli.") is instructed based on an instruction of the OS or a user operation, the camera appli. stored in the memory 1307 is activated (step S1401). Next, it is determined whether the camera unit 1104 or the camera unit 1200 is attached to any one of the module slots (step S1402). If neither of the camera units is attached, a warning message indicating that the camera appli. cannot be executed is displayed on the display panel 1114 (step S1403), and termination processing for terminating the camera appli. is performed (step S1404). In this termination processing, not only the linked operation of the camera unit and the base unit 1101 is terminated, but also, for example, data which has not been stored is stored in the memory 1307. Thereafter, the present process is terminated.

If either of the camera units is attached (YES in step S1402), the ID number of the module slot to which the camera unit is attached (hereinafter referred to as the "attachment slot") is stored in the memory 1307. Here, since the position information for each of the module slots on the base unit 1101 is stored in the memory 1307 in association with the ID number of each of the module slots, the control unit 1306 can determine the position of the attachment slot, based on the ID number. Thereafter, the determined position of the attachment slot is also stored in the memory 1307 (step S1405).

Next, the attitude of the base unit 1101 is determined by the attitude sensor 1311 (step S1406). Here, it is determined whether the longitudinal direction of the base unit 1101 of the information terminal 1100 held by the user is substantially horizontal (the horizontal attitude) or whether the longitudinal direction is substantially vertical (the vertical attitude), and the determined attitude is stored in the memory 1307. Thereafter, image data of a corresponding UI (hereinafter referred to as the "corresponding UI") is retrieved based on the position of the attachment slot and the attitude of the base unit 1101 stored in the memory 1307 (step S1407). Next, the corresponding UI is displayed on the display panel 1114 (step S1408).

Figure 15A:
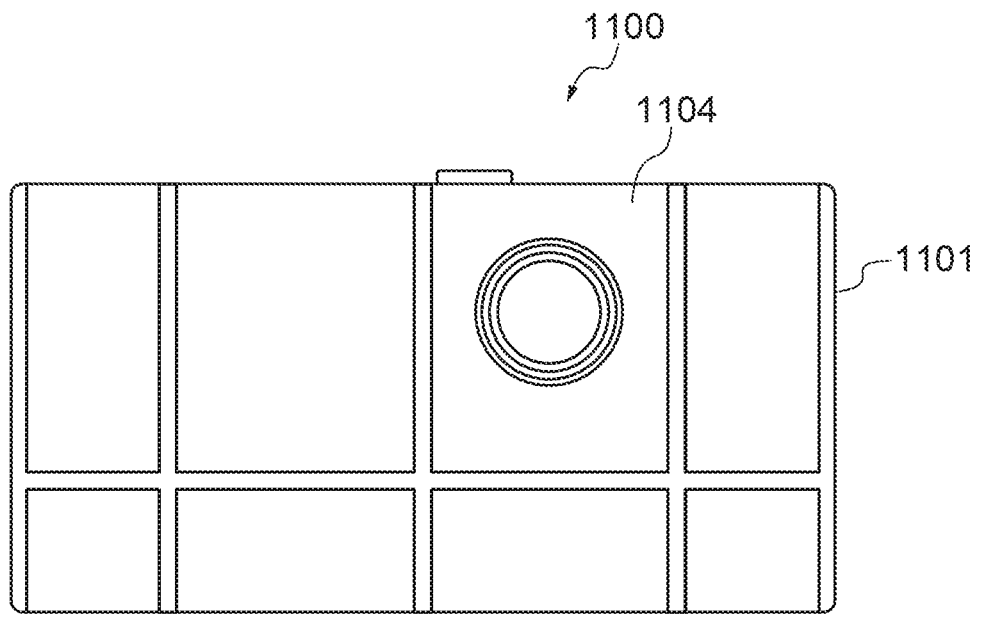
FIG. 15A and FIG. 15B are views showing a case where the base unit is in the horizontal attitude and the position of the attachment slot of the camera head is on the right in the front view.
Figure 15B:
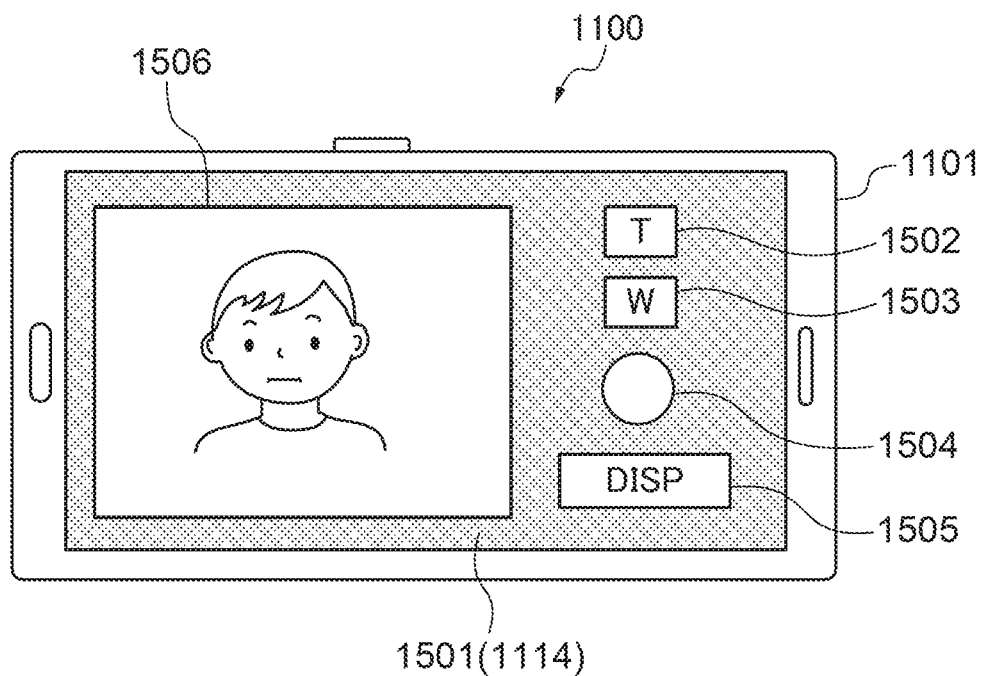

FIG. 15A and FIG. 15B are views showing a case in which the attitude of the base unit 1101 is the horizontal attitude and the position of the attachment slot of the camera head is on the right side in the front view of the information terminal 1100 (when the information terminal 1100 is viewed from the module units side). In this case, the control unit 1306 displays a horizontal right-hand operation UI 1501 (operating section) (FIG. 15B) on the display panel 1114. When the position of the attachment slot is on the right side in the front view of the information terminal 1100 (hereinafter simply referred to as the "front view") (FIG. 15A), the user holds the left portion of the base unit 1101 in the front view with the right hand so as not to cover the camera unit 1104 with the hand. In other words, the user holds the right portion of the base unit 1101 in the rear view of the information terminal 1100 (hereinafter simply referred to as the "rear view") (when the information terminal 1100 is viewed from the display panel 1114 side) with the right hand.

Correspondingly, in the horizontal right-hand operation UI 1501, all operation icons 1502 to 1505 are arranged on the right side in the display panel 1114, and a camera-through image 1506 for subject confirmation is arranged on the left side in the display panel 1114. The operation icons 1502 to 1505 include an operation icon for view-angle adjustment and a release button. Hence, since the subject and the camera-through image 1506 can be placed at opposed positions, the user can perform shooting naturally without being conscious of a positional deviation between the subject image and the camera-through image 1506. Moreover, the user can touch the operation icons 1502 to 1505 with the right hand which is holding the base unit 1101.

In the horizontal right-hand operation UI 1501, when the user touches the release button 1504 that is an operation icon, the base unit 1101 and the camera unit 1104 operate in a linked manner and perform shooting. More specifically, in response to touching the release button 1504, the control unit 1306 transmits a shooting command from the slot I/F 1313 to the camera unit 1104. Then, the camera unit 1104 receives the transmitted shooting command by the module I/F 1305, and the camera control unit 1303 performs shooting according to the shooting command. Further, the camera unit 1104 transmits image data of the shot subject image from the module I/F 1305 to the base unit 1101.

Figure 16A:
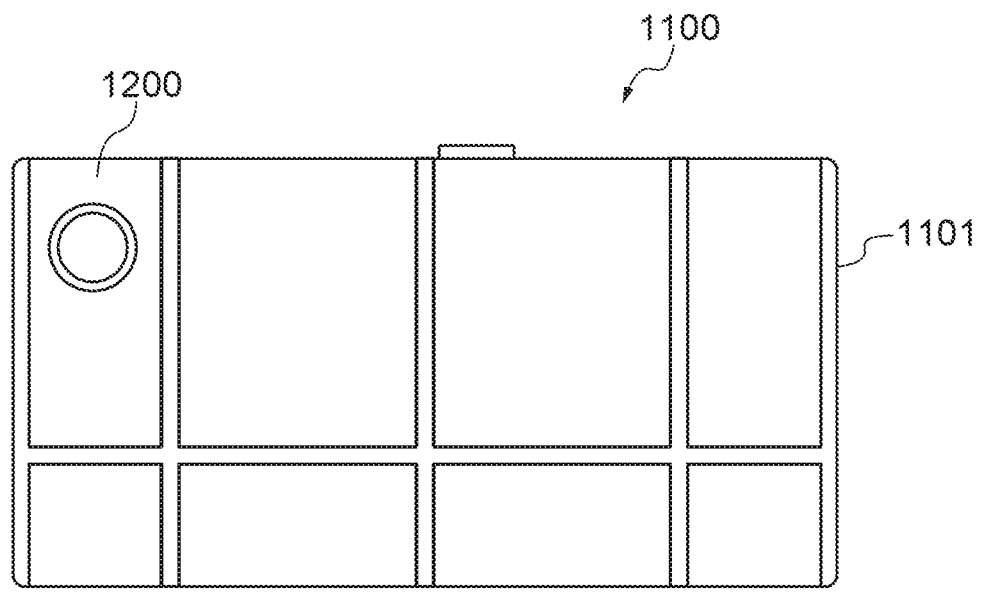
FIG. 16A and FIG. 16B are views showing a case where the base unit is in the horizontal attitude and the position of the attachment slot of the camera head is on the left in the front view.
Figure 16B:
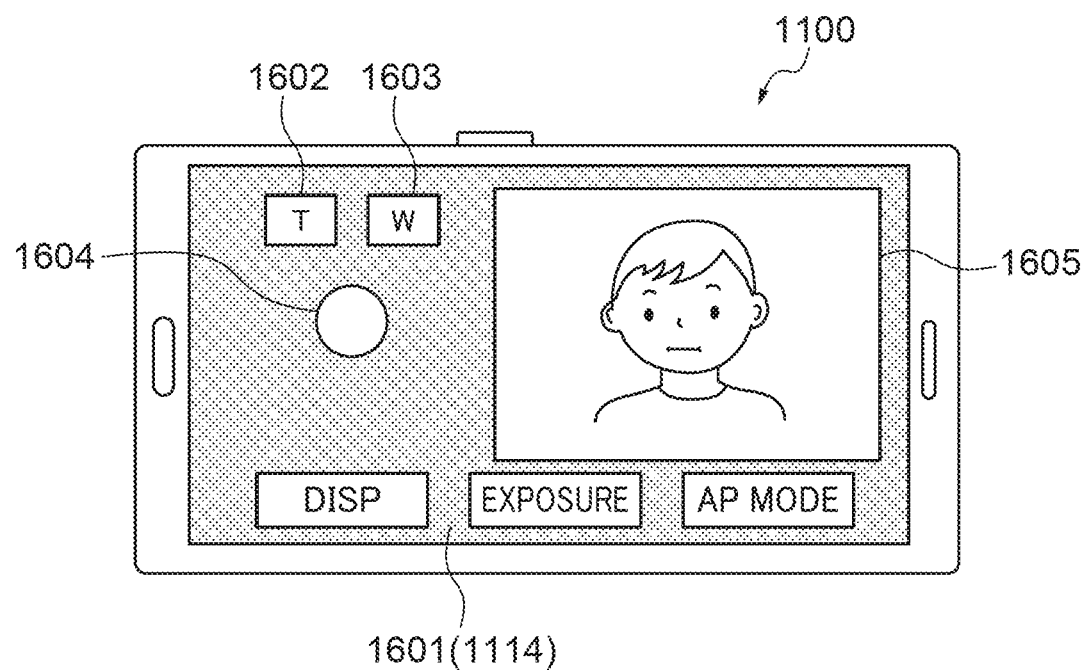

FIG. 16A and FIG. 16B are views showing a case where the base unit 1101 is in the horizontal attitude and the position of the attachment slot of the camera head is on the left side in the front view. In this case, the control unit 1306 displays a horizontal left-hand operation UI 1601 (operating section) (FIG. 16B) on the display panel 1114. When the position of the attachment slot is on the left side in the front view (FIG. 16A), the user holds the right portion of the base unit 1101 in the front view with the left hand so as not to cover the camera unit 1200 with the hand. In other words, in the rear view, the user holds the left portion of the base unit 1101 with the left hand.

Correspondingly, in the horizontal left-hand operation UI 1601, main operation icons 1602 to 1604 are arranged on the left side in the display panel 1114, and a camera-through image 1605 for subject confirmation is arranged on the right side in the display panel 1114. The operation icons 1602 to 1604 include an operation icon for view-angle adjustment, and a release button. Hence, the user can touch the operation icons 1602 to 1604 with the left hand which is holding the base unit 1101. In the horizontal left-hand operation UI 1601, when the release button 1604 that is an operation icon is touched by the user, the base unit 1101 and the camera unit 1200 operate in a linked manner and perform shooting.

Figure 17A:
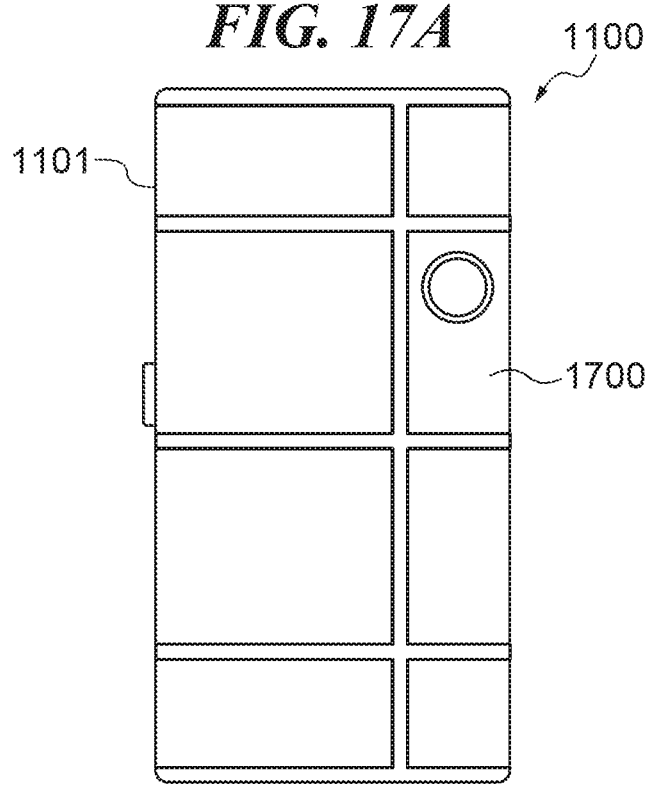
FIG. 17A and FIG. 17B are views showing a case where the base unit is in the vertical attitude and the position of the attachment slot of the camera head is on the upper side.
Figure 17B:
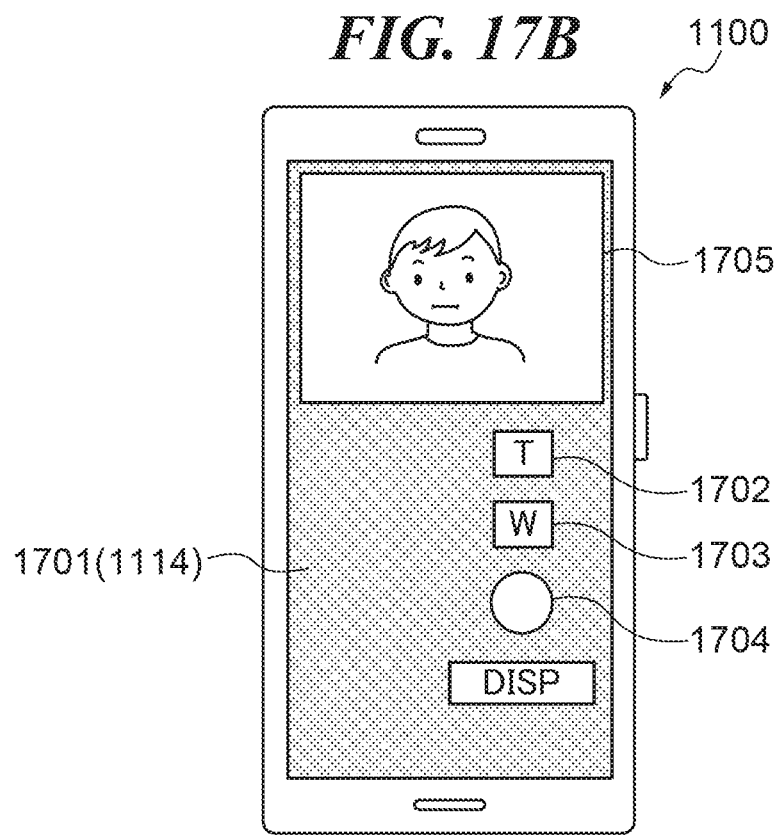

FIG. 17A and FIG. 17B are views showing a case where the base unit 1101 is in the vertical attitude and the position of the attachment slot is on the upper side. In this case, the control unit 1306 displays a vertical lower-side operation UI 1701 (operating section) (FIG. 17B) on the display panel 1114. When the position of the attachment slot is on the upper side (FIG. 17A), the user holds the lower portion of the base unit 1101 with either hand so as not to cover the camera unit 1700 with the hand.

Correspondingly, in the vertical lower-side operation UI 1701, main operation icons 1702 to 1704 are arranged on the lower side in the display panel 1114, and a camera-through image 1705 for subject confirmation is arranged on the upper side in the display panel 1114. The operation icons 1702 to 1704 include an operation icon for view-angle adjustment, and a release button. Hence, the user can touch the operation icons 1702 to 1704 with the hand which is holding the lower portion of the base unit 1101. In the vertical lower-side operation UI 1701, when the release button 1704 that is an operation icon is touched by the user, the base unit 1101 and the camera unit 1700 operate in a linked manner and perform shooting.

Figure 18A:
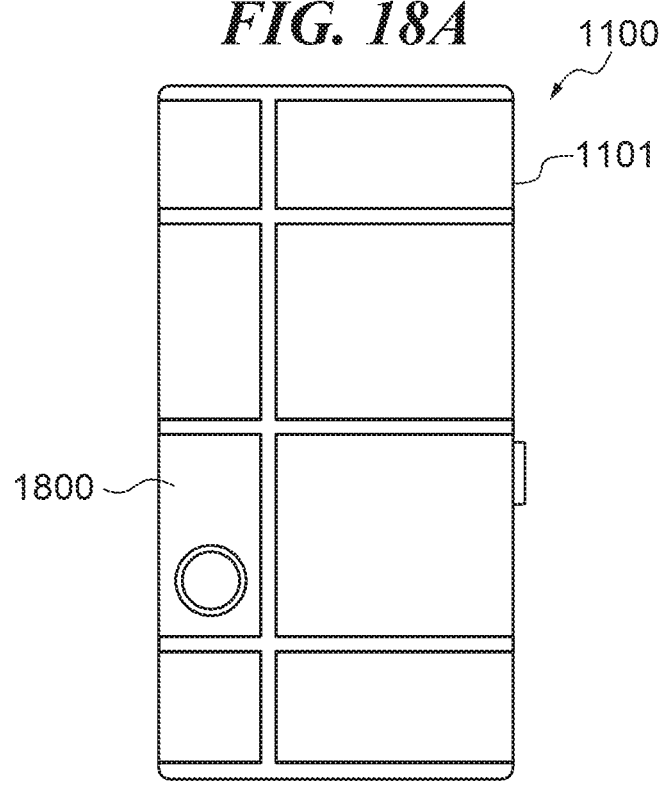
FIG. 18A and FIG. 18B are views showing a case where the base unit is in the vertical attitude and the position of the attachment slot of the camera head is on the lower side.
Figure 18B:
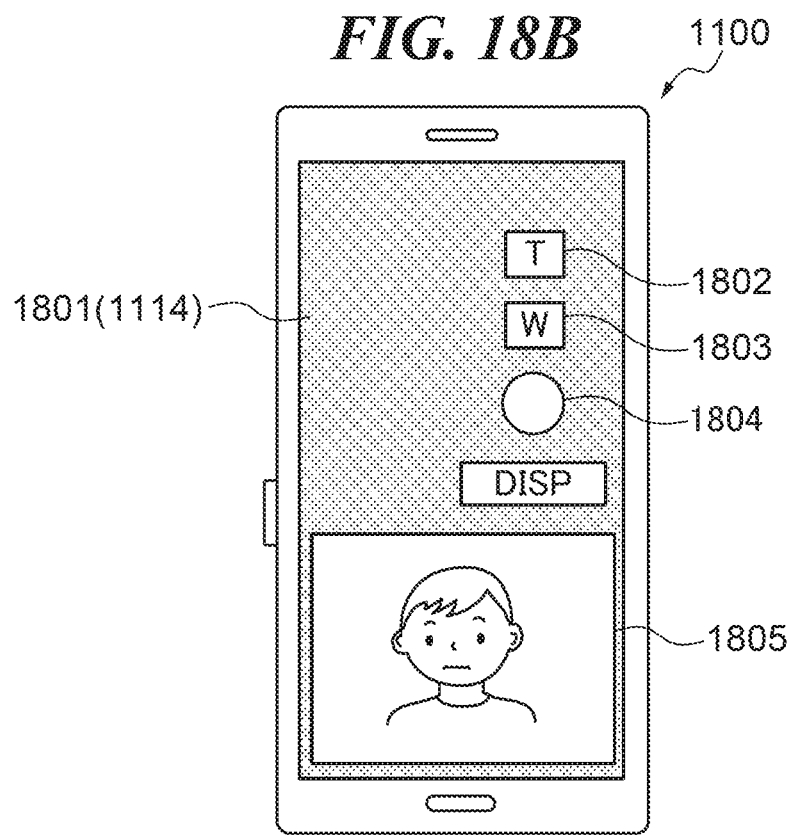

FIG. 18A and FIG. 18B are views showing a case where the base unit 1101 is in the vertical attitude and the position of the attachment slot of the camera head is on the lower side. In this case, the control unit 1306 displays a vertical upper-side operation UI 1801 (operating section) (FIG. 18B) on the display panel 1114. When the position of the attachment slot is on the lower side (FIG. 18A), the user holds the upper portion of the base unit 1101 with either hand so as not to cover the camera unit 1800 with the hand.

Correspondingly, in the vertical upper-side operation UI 1801, main operation icons 1802 to 1804 are arranged on the upper side in the display panel 1114, and a camera-through image 1805 for subject confirmation is arranged on the lower side in the display panel 1114. The operation icons 1802 to 1804 include an operation icon for view-angle adjustment, and a release button. Hence, the user can touch the operation icons 1802 to 1804 with the hand which is holding the upper portion of the base unit 1101. In the vertical upper-side operation UI 1801, when the release button 1804 that is an operation icon is touched by the user, the base unit 1101 and the camera unit 1800 operate in a linked manner and perform shooting.

Thereafter, it is determined whether or not termination of the camera appli. is instructed (step S1409). If termination of the camera appli. is not instructed, the process returns to step S1402, whereas if termination of the camera appli. is instructed, the process proceeds to step S1404.

According to the process of FIG. 14, the operation UI 1501, 1601, 1701, 1801 to be displayed on the display panel 1114 is changed according to the attitude of the base unit 1101 and the position of the attachment slot. In all of the operation UI 1501, 1601, 1701, 1801, the main operation icons are displayed near the hand which is holding the base unit 1101. Hence, the user can touch the main operation icons with the hand which is holding the base unit 1101, and it is possible to prevent deterioration in the operability.

Next, the third embodiment of the present invention will be described. In the third embodiment, similarly to the second embodiment, an image pickup system is configured with a module assembling type information terminal. Therefore, description of configurations and functions overlapping with the second embodiment will be omitted, and different configurations and functions will be described below.

Figure 19A:
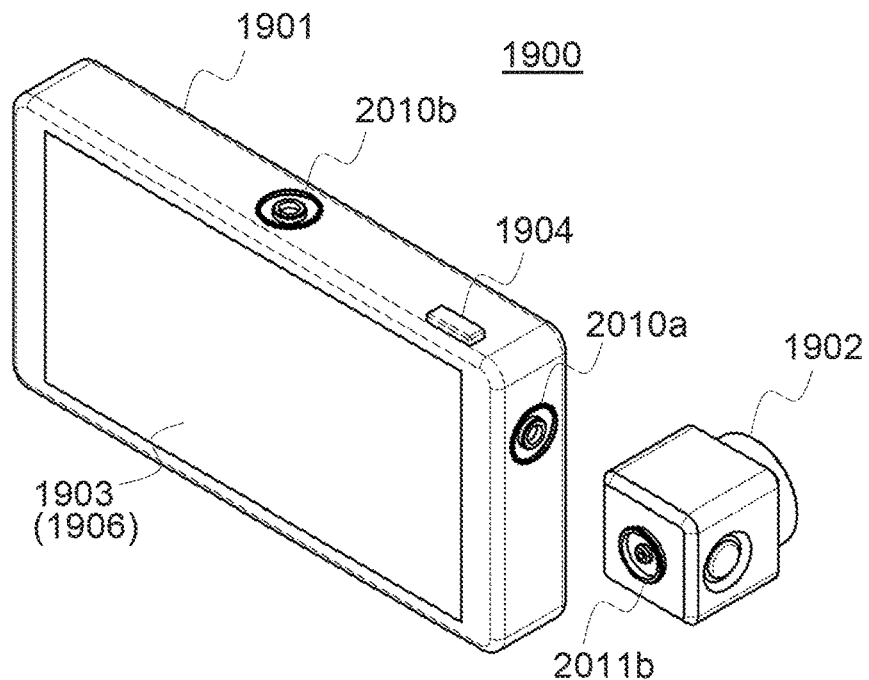
FIG. 19A to FIG. 19C are views showing a configuration of a module assembling type information terminal as an image pickup system according to a third embodiment of the present invention.
Figure 19B:
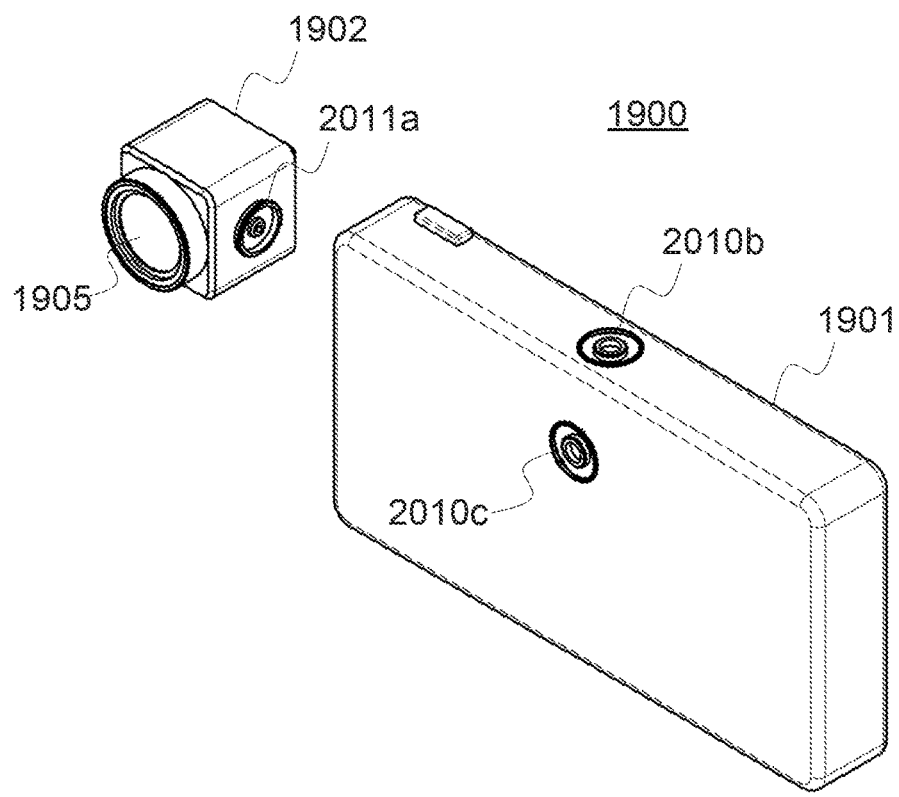
Figure 19C:
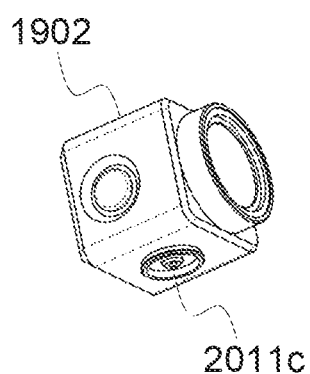

FIG. 19A to FIG. 19C are views showing a configuration of a module assembling type information terminal (hereinafter simply referred to as the "information terminal") 1900 as an image pickup system according to the third embodiment of the present invention. The information terminal 1900 constitutes an image pickup system by attaching a camera unit 1902 (an image pickup apparatus module) to a base unit 1901 (display apparatus) in the form of a flat box. FIG. 19A is a perspective view of the base unit 1901 and the camera unit 1902 of the image pickup system 1900 when viewed from one side. FIG. 19B is a perspective view of the base unit 1901 and the camera unit 1902 when viewed from the side opposite to the one side.

As shown in FIG. 19A and FIG. 19B, the base unit 1901 includes a display panel 1903 on one side (display side), and a power button 1904 on a long side face. A touch panel 1906 that is an input apparatus is physically superimposed on the display panel 1903. Further, the base unit 1901 includes one each of module interfaces 2010a to 2010c for attaching module apparatuses to the opposite side to the display side, the long side face, and a short side face, respectively.

On the other hand, a cube-shaped camera unit 1902 as an module apparatus to be attached to the base unit 1901 includes a shooting lens 1905 on one side face. The camera unit 1902 includes one each of module interfaces 2011a to 2011c for attaching the camera unit 1902 to the base unit 1901 on a face on the opposite side to the shooting lens 1905 and two side faces, which are parallel to the shooting optical axis and orthogonal to each other, respectively (FIG. 19A to FIG. 19C).

Figure 20A:
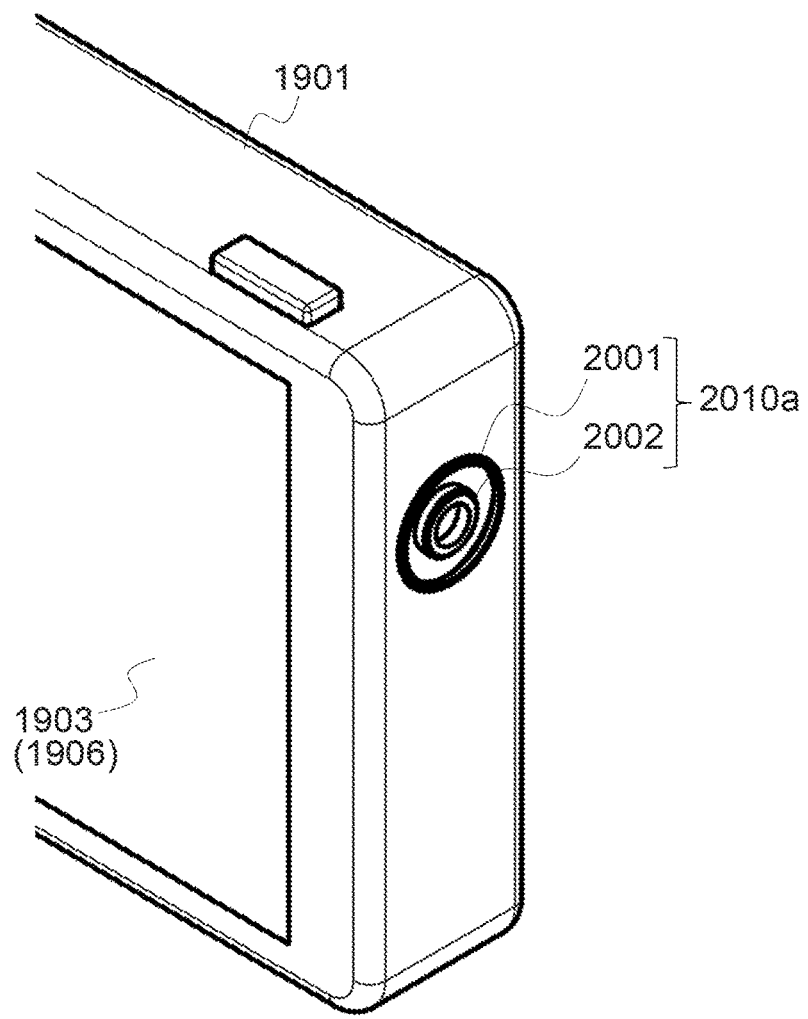
FIG. 20A and FIG. 20B are views for explaining the structures of module interfaces of a base unit and a camera unit of FIG. 19.
Figure 20B:
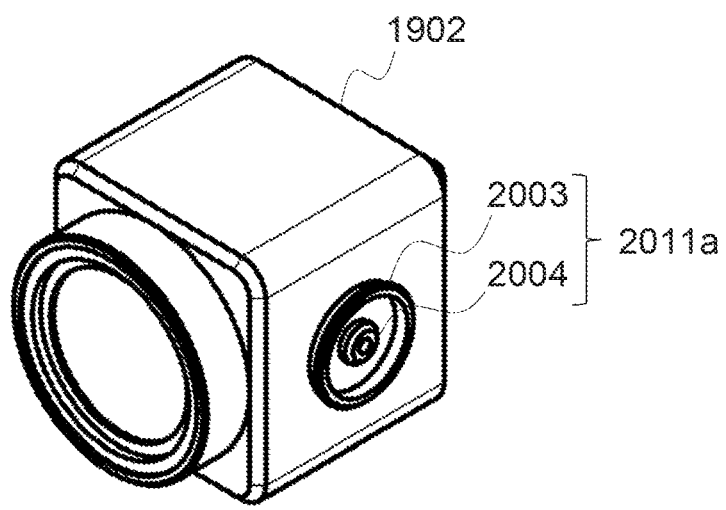

Next, the module interfaces will be described. FIG. 20A shows the module interface 2010a of the base unit 1901, and FIG. 20B shows the module interface 2011a of the camera unit 1902. The module interface 2010a of the base unit 1901 is configured by combining an annular engagement groove 2001 and a connection connector 2002 that is an annular projection arranged at the center of the engagement groove 2001. An engagement ring 2003 that is an annular projection of the camera unit 1902 is fitted in the engagement groove 2001, and a connection plug 2004 that is a shaft-like projection of the camera unit 1902 is fitted in the connection connector 2002. When the connection plug 2004 is fitted in the connection connector 2002, the camera unit 1902 and the base unit 1901 are electrically connected.

On the other hand, the module interface 2011a of the camera unit 1902 includes the engagement ring 2003, and the connection plug 2004 arranged at the center of the engagement ring 2003. The module interfaces of the camera unit 1902 and the base unit 1901 in the present embodiment are engaged with each other in a fitted relationship. Therefore, hereinafter the module interface of the base unit 1901 will be referred to as the receiving-side module interface, and the interfaces on the module apparatuses including the camera unit 1902 will be referred to as the "fitting module interface". With the module interfaces of the present embodiment, a connection is realized by the engagement of the annular projection and the annular groove. Hence, the base unit 1901 and the module apparatus which are connected to each other can be moved relatively and pivotally about the module interfaces.

All of the three receiving-side module interfaces 2010a to 2010c of the base unit 1901 have the same configuration. The three fitting module interfaces 2011a to 2011c of the camera unit 1902 have the same configuration. Fitting module interfaces of another module apparatus have the same configuration as the fitting module interfaces 2011a to 2011c of the camera unit 1902. Therefore, it is possible to attach the camera unit 1902 or the another module apparatus to each of the three receiving-side module interfaces 2010a to 2010c of the base unit 1901 while changing the orientation according to the situation.

Figure 21A:
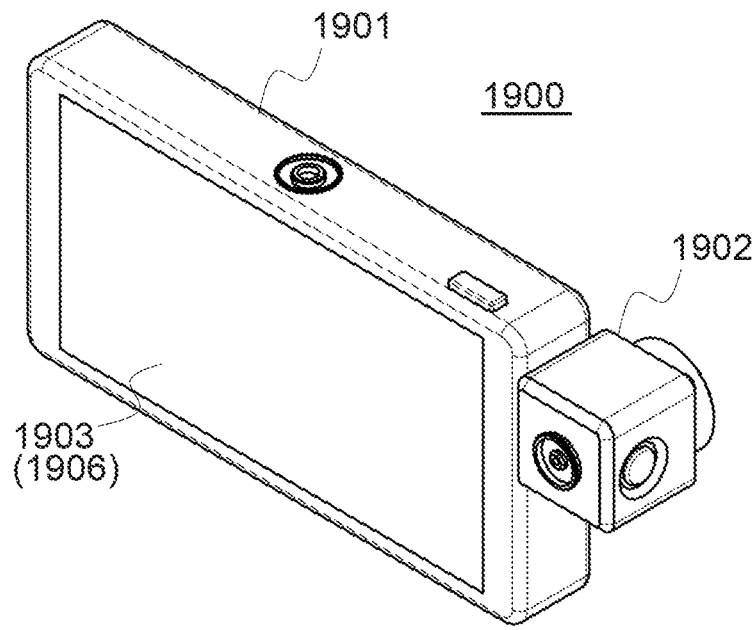
FIG. 21A to FIG. 21C are views showing an example of a connection mode in the information terminal of FIG. 19.
Figure 21B:
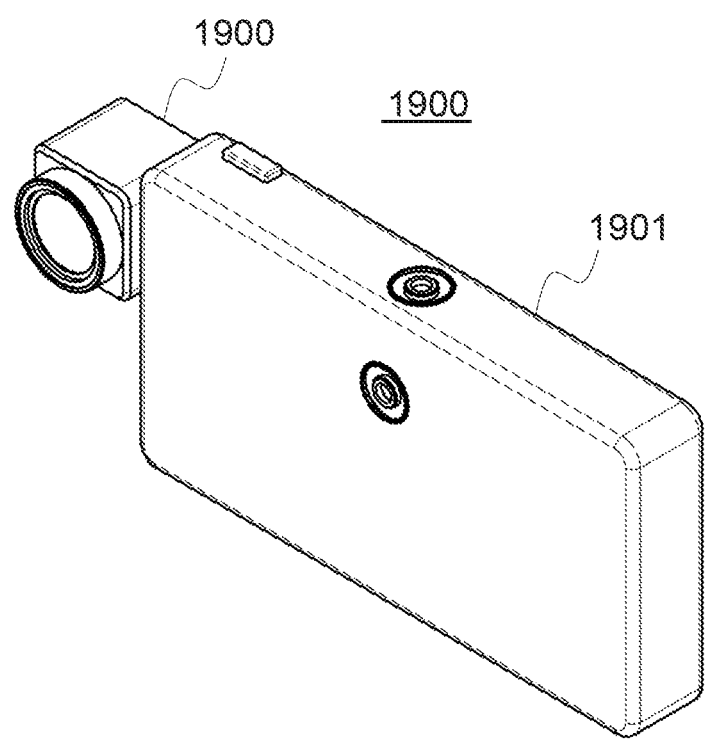
Figure 21C:
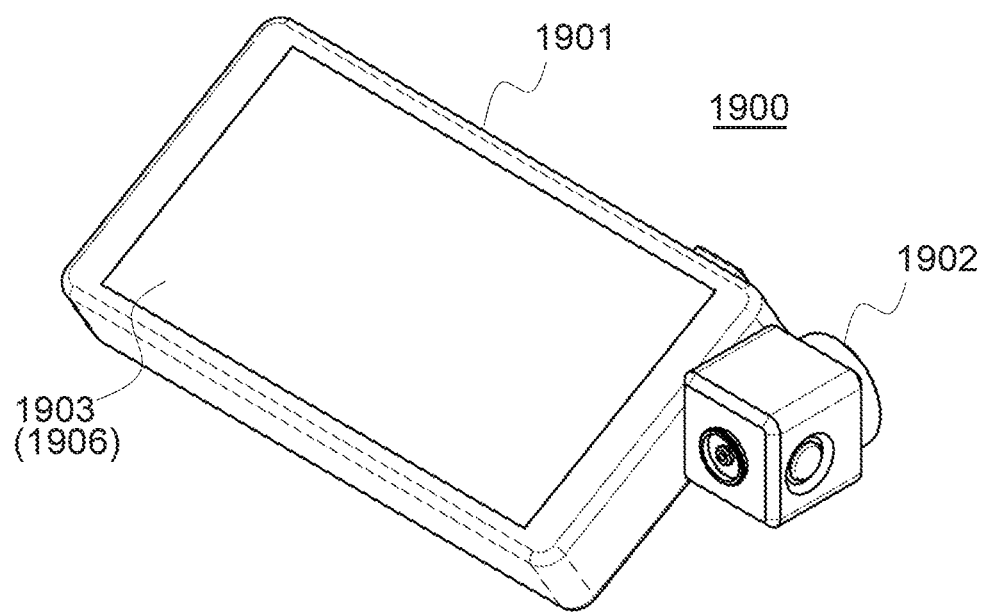

FIG. 21A to FIG. 21C are views showing an example of a connection mode in the information terminal of FIG. 19. In FIG. 21A to FIG. 21C, the fitting module interface 2011a of the camera unit 1902 is fitted in the receiving-side module interface 2010a of the base unit 1901. As described above, since the camera unit 1902 can be pivotally moved relative to the base unit 1901, the orientation of the display panel 1903 with respect to the shooting optical axis can be changed from the orientation shown in FIG. 21A to the orientation shown in FIG. 21C according to the shooting situation.

In the connection mode shown in FIG. 21A to FIG. 21C, the user holds the base unit 1901 with the left hand and holds the camera unit 1902 with the right hand, and pivotally moves and twists the base unit 1901 or the camera unit 1902 with each other. For example, at the time of so-called low angle shooting when the user holds the information terminal 1900 at a position lower than the chest of the user, it is possible to appropriately adjust the orientation of the display panel 1903 by pivotally moving the base unit 1901 relative to the camera unit 1902.

Further, with the image pickup system 1900, it is possible to realize various connection modes of the camera unit 1902 and the base unit 1901 by changing the receiving-side module interface to which the camera unit 1902 is attached.

Figure 22A:
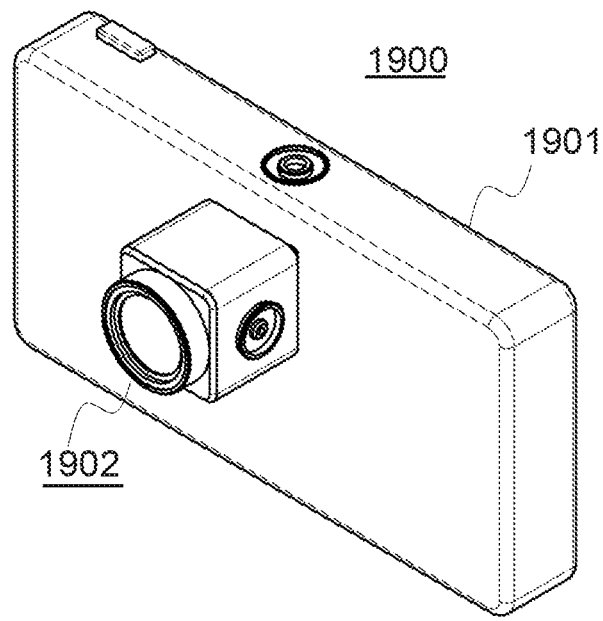
FIG. 22A to FIG. 22D are views showing modified examples of the connection mode in the information terminal of FIG. 19.
Figure 22B:
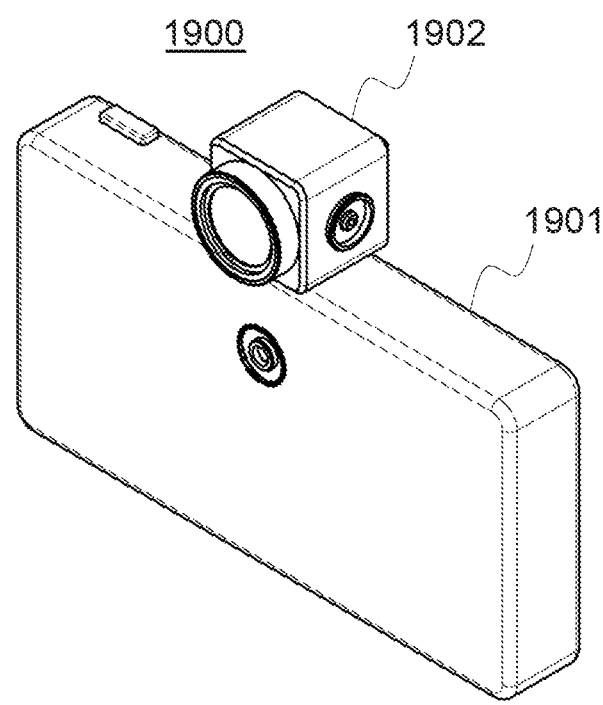

For example, in the connection modes shown in FIG. 22A and FIG. 22B, since the camera unit 1902 and the display panel 1903 are aligned on the shooting optical axis, the parallax at the time of shooting is smaller, so that shooting is considered to be performed more easily compared to the connection mode shown in FIG. 21A to FIG. 21C. In particular, in the connection mode shown in FIG. 22B, the camera unit 1902 can be moved pivotally to the left and right relative to the base unit 1901.

Figure 22C:
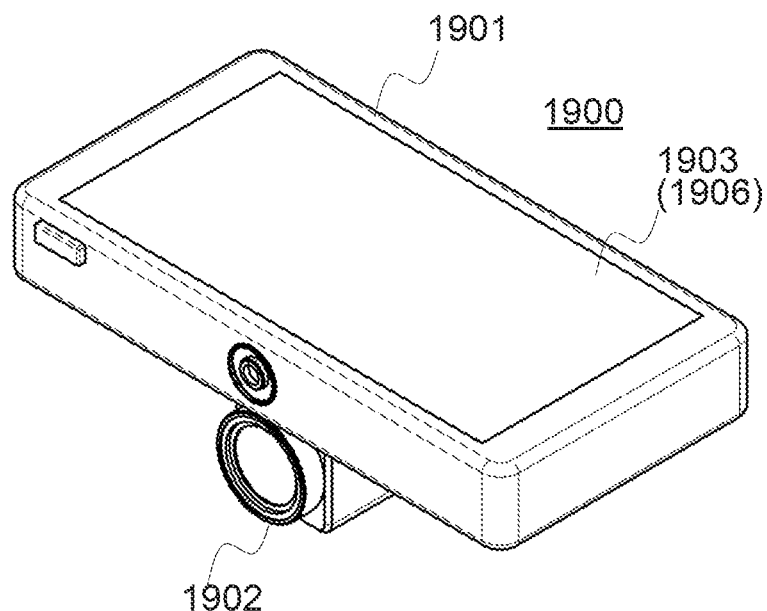
Figure 22D:
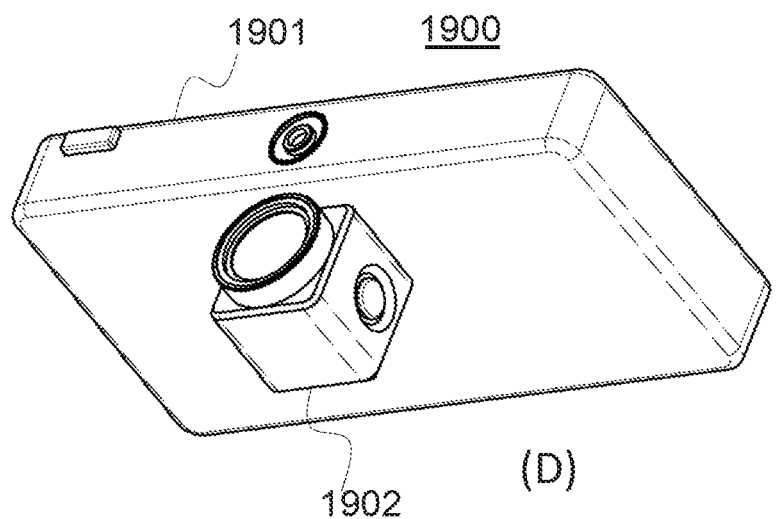

In the connection mode shown in FIG. 22C and FIG. 22D, the display panel 1903 is parallel to the shooting optical axis of the camera unit 1902. In this connection mode, shooting can be performed while comfortably holding the information terminal 1900 in front of the chest or stomach of the user without lifting the information terminal 1900 to the level of the eyes of the user, and this connection mode is particularly suitable for low angle shooting. Furthermore, in this connection mode, it is easy to perform complicated operations on the touch panel 1906 with both thumbs while firmly holding the base unit 1901 with both hands.

In the information terminal 1900, as described above, various module apparatuses other than the camera unit 1902, for example, a lighting unit, a wireless communication unit, and a GPS unit can be attached to the base unit 1901. In short, with the information terminal 1900, it is possible to realize a connection mode optimal for a purpose and a situation by attaching an appropriate module apparatus to the base unit 1901 according to the purpose and the situation. It should be noted that, for module apparatuses other than the camera unit 1902, it is also possible to realize various connection modes to the base unit 1901.

Moreover, the number and positions of the module interfaces of the base unit 1901 and the module apparatuses are not limited to the numbers and positions described above. Further, the structures of the module interfaces, the engagement modes and the electrical connection modes are not limited to those described above. For example, the engagement modes may include a mode using fastening members such as screws, or a mode using attraction by a magnetic force. Furthermore, the electrical connection mode is not essential, and signal transmission may be performed by contactless communication unit.

Figure 23:
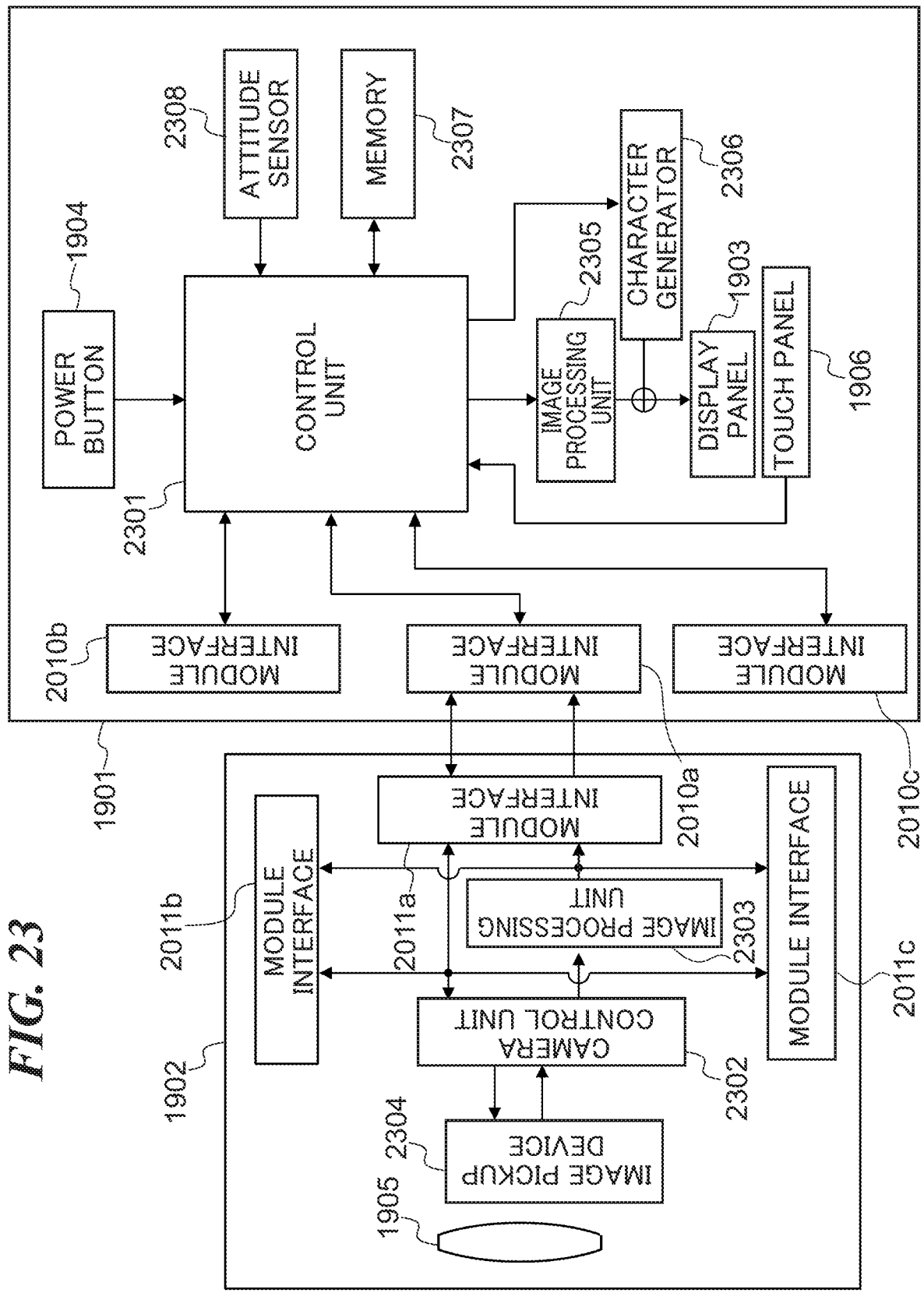
FIG. 23 is a block diagram schematically showing the configuration of the information terminal of FIG. 19.

FIG. 23 is a block diagram schematically showing the configuration of the information terminal of FIG. 19A to FIG. 19C. The configuration of the information terminal 1900 will be described further with reference to FIG. 23. It should be noted that the description of configuration overlapping with the second embodiment will be omitted, and only configurations and functions unique to the present embodiment will be described.

As described above, the base unit 1901 includes the three receiving-side module interfaces 2010a to 2010c. The connection connector 2002 of each of the receiving-side module interfaces 2010a to 2010c is connected to the control unit 2301, and the control unit 2301 detects a connection of a module apparatus and transmits and receives control signals and data signals to/from the connected module apparatus. For example, when the camera unit 1902 is connected, specifically control signals for shooting timing, focus adjustment, view-angle adjustment, etc. and shot image data signals are transmitted and received. Each of the three receiving-side module interfaces 2010a to 2010c has a unique identification ID, and the control unit 2301 can determine and control which of the receiving-side module interfaces is used for transmission and reception with reference to each of the identification ID. Further, the base unit 1901 includes a memory 2307, an image processing unit 2305, a character generator 2306, and an attitude sensor 2308. These devices have functions similar to the functions of the memory 1307, the image processing unit 1308, the character generator 1309 and the attitude sensor 1311 of the base unit 1101 according to the second embodiment.

On the other hand, the camera unit 1902 includes the three fitting module interfaces 2011a to 2011c. The connection plug 2004 of each of the fitting module interfaces 2011a to 2011c is connected to the camera control unit 2302 and the image processing unit 2303, and the camera control unit 2302 or another unit transmits and receives a module identification signal, control signals and image data signals to/from the connected base unit 1901. The module identification signal is a signal for transmitting attributes and unique information about the module apparatus to the base unit 1901. Based on the module identification signal, the control unit 2301 of the base unit 1901 transmits a control signal corresponding to an operation on the touch panel 1906 to the module apparatus. Each of the three fitting module interfaces 2011a to 2011c has unique identification ID, and the camera control unit 2302 can detect the connection plug 2004 connected to the base unit 1901 by referring to each of the identification ID. The camera control unit 2302 transmits information based on the identification ID of the detected fitting module interface as a control signal to the control unit 2301 of the base unit 1901. Further, the camera unit 1902 includes an image pickup device 2304 connected to the camera control unit 2302.

With the above configuration, the control unit 2301 of the base unit 1901 can identify which module apparatus is connected to which receiving-side module interface of the base unit 1901 and what orientation the module apparatus is in. For example, the control unit 2301 can detect in which connection mode of various connection modes as shown in FIG. 21A to FIG. 21C and FIG. 22A to FIG. 22D the camera unit 1902 is connected. At this time, based on the identified connection mode, the control unit 2301 changes the operation UI to be displayed on the display panel 1903 and the content of a response to touching of the touch panel 1906.

Next, as examples of an operation UI in the present embodiment, an operation UI in the connection mode shown in FIG. 21A to FIG. 21C and an operation UI in the connection mode shown in FIG. 22C and FIG. 22D will be described.

Figure 24:
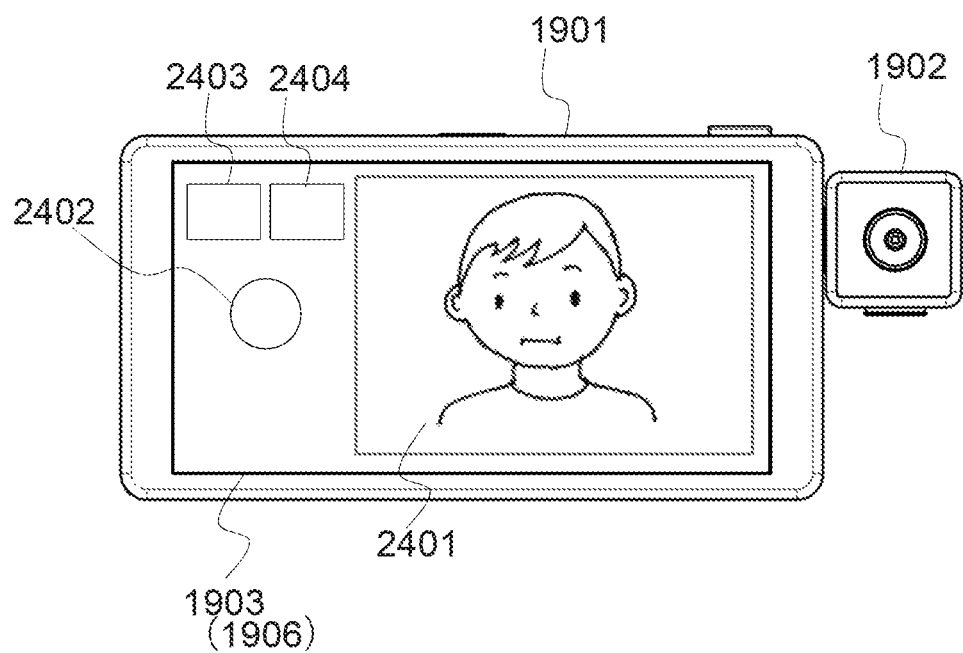
FIG. 24 is a view showing an operation UI of the information terminal in the connection mode shown in FIG. 21.

FIG. 24 shows the operation UI in the connection mode shown in FIG. 21A to FIG. 21C. As described above, in the connection mode shown in FIG. 21A to FIG. 21C, the user holds the base unit 1901 with the left hand and holds the camera unit 1902 with the right hand, and performs shooting while appropriately adjusting the orientation of the display panel 1903 by pivotally moving and twisting the camera unit 1902 and the display panel 1903 with each other.

Thus, since the right hand of the user is often away from the base unit 1901, the operation UI is arranged on the left-hand side of the base unit 1901 so that the operation UI is easily operated with the left hand of the user. More specifically, a camera-through image 2401 for subject confirmation is displayed on the right-hand side in the display panel 1903. On the other hand, a release button 2402 and zoom buttons 2403, 2404 constituting the operation UI are arranged collectively as operation icons on the display panel 1903 within a range reachable by the thumb of the left hand which is holding the base unit 1901. The operation icons may be arranged on the display panel 1903 in regions spaced apart from one another, but not arranged on the display panel 1903 in mutually adjacent regions, when viewed from a side of the camera unit 1902 attached to the base unit 1901. In the connection mode shown in FIG. 21, it is necessary to hold the base unit 1901 and operate the buttons with only the left hand and it is difficult to perform complicated button operations, and therefore the operation UI provides only minimum necessary operation icons. When the user touches each operation icon, the touched position is detected by the touch panel 1906, a control signal corresponding to the touched position is transmitted from the control unit 2301 to the camera control unit 2302, and a predetermined operation is executed.

FIG. 25 shows an operation UI in the connection mode shown in FIG. 22C and FIG. 22D. As described above, in the connection mode shown in FIG. 22C and FIG. 22D, since the user holds the base unit 1901 with both hands, it is easy to perform complex operations on the touch panel 1906 with both thumbs, and therefore the operation UI enabling more precise operations is provided.

More specifically, a camera-through image 2501 is displayed in the center of the display panel 1903. Moreover, a release button 2502 and a zoom slider 2503 for view-angle adjustment are displayed on the left-hand side in the display panel 1903. With the zoom slider 2503, a view-angle adjustment is made by dragging the slider 2504 and moving the slider 2504 on a bar 2505. With the zoom slider 2503, it is possible to intuitively adjust the view angle at the time of shooting to a desired view angle by dragging the slider 2504, and it is also possible to control the view angle changing speed by changing the drag speed of the slider 2504.

Further, various setting buttons relating to shooting are displayed on the right-hand side in the display panel 1903. More specifically, an exposure adjustment setting button 2506, an aperture setting button 2507, a shutter speed setting button 2508, a screen display switching button 2509, and an AF mode button 2510 for switching an autofocus operation are displayed on the right-hand side in the display panel 1903. According to touching of each of the various setting buttons, a sub UI for changing the corresponding setting values is displayed. FIG. 25 shows, as an example, a mode in which an exposure adjustment slider 2511 is displayed in response to touching of the exposure adjustment setting button 2506. With the exposure adjustment slider 2511, similarly to the zoom slider 2503, it is possible to select an adjustment value by dragging a slider 2512.

As described above, the information terminal 1900 detects the connection mode of the base unit 1901 and the camera unit 1902, and provides an operation UI suitable for the detected connection mode. For example, in the connection mode shown in FIG. 21, the operation UI which is conveniently operated with only the left hand is provided, whereas in the connection mode shown in FIG. 22C and FIG. 22D, the UI allowing a more precise operation than the operation UI shown in FIG. 21A to FIG. 21C is provided. It should be noted that even when a module apparatus other than the camera unit 1902 is connected to the base unit 1901, the control unit 2301 detects the module identification signal and the connection mode, and therefore it is possible to provide an operation UI suitable for the connection mode to the module apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-182489, filed Sep. 22, 2017, which is hereby incorporated by reference herein in its entirety.

What is claimed is:

1. A display apparatus that performs shooting in a linked manner with an image pickup apparatus attachable to the display apparatus, the display apparatus comprising:
   a display unit having a touch panel; and
   a controller,
   wherein the display unit is configured to display an operating section used for receiving therethrough an operation of controlling an operation of the image pickup apparatus, and
   wherein the controller is configured to change a process corresponding to the operation received through the operating section, according to an attaching position of the image pickup apparatus by controlling the display unit to display an operation icon as at least a part of the operating section on the touch panel and to change a position at which the operation icon is displayed on the touch panel according to the attaching position of the image pickup apparatus such that (i) the operating icon is displayed at a first position on the touch panel in a case where the attaching position of the image pickup apparatus is a first attaching position and (ii) the operating icon is displayed at second position on the touch panel not overlapping with the first position on the touch panel in a case where the attaching position of the image pickup apparatus is a second attaching position different from the first attaching position.

2. The display apparatus according to claim 1, wherein the display unit changes the operating section to be displayed, according to the attaching position of the image pickup apparatus.

3. The display apparatus according to claim 1, further comprising a transmitter configured to transmit a control command corresponding to the operation received through the operating section to the image pickup apparatus,
   wherein the controller changes the control command, according to the attaching position of the image pickup apparatus.

4. The display apparatus according to claim 1, wherein the display unit displays the operation icon on the touch panel such that the operation icon is spaced apart from a position opposed to the image pickup apparatus.

5. The display apparatus according to claim 1, further comprising an attaching-position detector configured to detect the attaching position of the image pickup apparatus.

6. The display apparatus according to claim 1, wherein the controller is configured to receive, from the image pickup apparatus, information indicating a position at which the image pickup apparatus is attached to the display apparatus.

7. The display apparatus according to claim 1, further comprising an attitude detector configured to detect an attitude of the display apparatus,
   wherein the controller changes a process corresponding to an operation received through the operating section, according to the attaching position of the image pickup apparatus and the attitude of the display apparatus.

8. The display apparatus according to claim 1, further comprising:
   an attaching-position detector configured to detect the attaching position of the image pickup apparatus on the display apparatus; and
   transmitter configured to transmit information indicating the detected attaching position of the image pickup apparatus to the display apparatus.

9. An image pickup system comprising an image pickup apparatus, and a display apparatus that performs shooting in a linked manner with the image pickup apparatus attachable to the display apparatus,
   wherein the display apparatus comprises a display unit having a touch panel and a controller,
   wherein the display unit is configured to display an operating section used for receiving therethrough an operation of controlling an operation of the image pickup apparatus, and
   wherein the controller is configured to change a process corresponding to the operation received through the operating section, according to an attaching position of the image pickup apparatus by controlling the display unit to display an operation icon as at least a part of the operating section on the touch panel and to change a position at which the operation icon is displayed on the touch panel according to the attaching position of the image pickup apparatus such that (i) the operating icon is displayed at a first position on the touch panel in a case where the attaching position of the image pickup apparatus is a first attaching position and (ii) the operating icon is displayed at second position on the touch panel not overlapping with the first position on the touch panel in a case where the attaching position of the image pickup apparatus is a second attaching position different from the first attaching position.

10. The image pickup system according to claim 9, wherein the display apparatus further comprises attaching-position detector configured to detect the attaching position of the image pickup apparatus.

11. The image pickup system according to claim 9, wherein the image pickup apparatus comprises an attaching-position detector configured to detect the attaching position of the image pickup apparatus on the display apparatus, and a transmitter configured to transmit the detected attaching position to the display apparatus.

12. The image pickup system according to claim 9, wherein the display unit displays the operation icon on the touch panel such that the operation icon is spaced apart from a position opposed to the image pickup apparatus.

13. The image pickup system according to claim 9, wherein the display apparatus further comprises an attitude detector configured to detect an attitude of the display apparatus, and
   the controller changes a process corresponding to the operation received through the operating section, according to the attaching position of the image pickup apparatus and the attitude of the display apparatus.

14. A control method of a display apparatus that performs shooting in a linked manner with an image pickup apparatus attachable to the display apparatus, the control method comprising:
   displaying, on a touch panel of a display unit of the display apparatus, an operating section used for receiving therethrough an operation of controlling an operation of the image pickup apparatus; and
   changing a process corresponding to the operation received through the operating section, according to an attaching position of the image pickup apparatus by causing the display unit to display an operation icon as at least a part of the operating section on the touch panel and to change a position at which the operation icon is displayed on the touch panel according to the attaching position of the image pickup apparatus such that (i) the operating icon is displayed at a first position on the touch panel in a case where the attaching position of the image pickup apparatus is a first attaching position and (ii) the operating icon is displayed at second position on the touch panel not overlapping with the first position on the touch panel in a case where the attaching position of the image pickup apparatus is a second attaching position different from the first attaching position.

15. A non-transitory computer-readable storage medium storing a program that causes a computer to execute a control method of a display apparatus for performing shooting in a linked manner with an image pickup apparatus attachable to the display apparatus, the control method comprising:

displaying, on a touch panel of a display unit of the display apparatus, an operating section used for receiving therethrough an operation of controlling an operation of the image pickup apparatus; and changing a process corresponding to the operation received through the operating section, according to an attaching position of the image pickup apparatus by causing the display unit to display an operation icon as at least a part of the operating section on the touch panel and to change a position at which the operation icon is displayed on the touch panel according to the attaching position of the image pickup apparatus such that (i) the operating icon is displayed at a first position on the touch panel in a case where the attaching position of the image pickup apparatus is a first attaching position and (ii) the operating icon is displayed at second position on the touch panel not overlapping with the first position on the touch panel in a case where the attaching position of the image pickup apparatus is a second attaching position different from the first attaching position.

\* \* \* \* \*